(12) United States Patent
Ohki et al.

(10) Patent No.: US 7,177,482 B2
(45) Date of Patent: Feb. 13, 2007

(54) BOUNDARY LINE DETECTION APPARATUS AND METHOD, AND IMAGE PROCESSING APPARATUS AND METHOD AS WELL AS RECORDING MEDIUM

(75) Inventors: Mitsuharu Ohki, Tokyo (JP); Naosuke Asari, Chiba (JP); Kenji Kameda, Tokyo (JP)

(73) Assignee: Sony Corporation, Tokyo (JP)

( * ) Notice: Subject to any disclaimer, the term of this patent is extended or adjusted under 35 U.S.C. 154(b) by 584 days.

(21) Appl. No.: 09/734,262

(22) Filed: Dec. 11, 2000

(65) Prior Publication Data

US 2001/0024519 A1     Sep. 27, 2001

(30) Foreign Application Priority Data

Dec. 16, 1999  (JP)  ............................. P11-356820

(51) Int. Cl.
  *G06K 9/40*    (2006.01)
(52) U.S. Cl. .................. 382/269; 382/261; 382/275
(58) Field of Classification Search ................ 382/199, 382/269, 266, 261, 264, 274, 275
  See application file for complete search history.

(56) References Cited

U.S. PATENT DOCUMENTS

| | | | |
|---|---|---|---|
| 4,550,434 A | * 10/1985 | Shimada et al. | ............ 382/144 |
| 5,050,227 A | * 9/1991 | Furusawa et al. | ............ 382/269 |
| 5,271,064 A | * 12/1993 | Dhawan et al. | ............. 382/266 |
| 5,379,130 A | * 1/1995 | Wang et al. | ................. 358/462 |
| 5,561,724 A | * 10/1996 | Kido et al. | .................. 382/264 |
| 5,572,603 A | * 11/1996 | Koike | ......................... 382/199 |
| 6,415,049 B1 | * 7/2002 | Yanagita et al. | ............. 382/132 |
| 2002/0006231 A1 | * 1/2002 | Jayant et al. | ................ 382/266 |

FOREIGN PATENT DOCUMENTS

JP           07107294 A   *   4/1995

* cited by examiner

*Primary Examiner*—Vikkram Bali
*Assistant Examiner*—Colin LaRose
(74) *Attorney, Agent, or Firm*—Bell, Boyd & Lloyd LLP

(57) ABSTRACT

A boundary line detection apparatus and method and an image processing apparatus and method as well as a recording medium by which the jaggy in the proximity of a boundary line is removed without increasing the sampling rate to remove are disclosed. The differences between pixel values between a noticed pixel and pixels in the proximity of the noticed pixel are compared with each other to detect whether or not a boundary is present in the proximity of the noticed pixel. Then, a length, a direction, and a start point and an end portion of the boundary line are determined. Then, the distance between the noticed pixel and the boundary line is calculated, and the pixel value of the noticed pixel is weighted using the distance. Then, the pixel obtained by the weighting is outputted.

6 Claims, 21 Drawing Sheets

F I G. 1
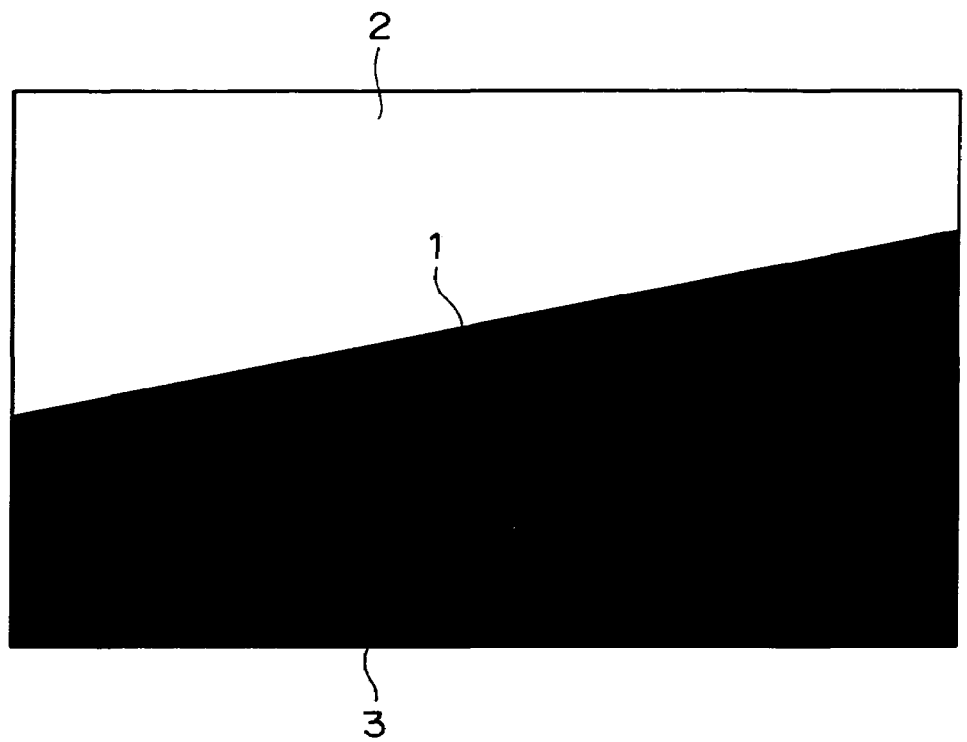
F I G. 2
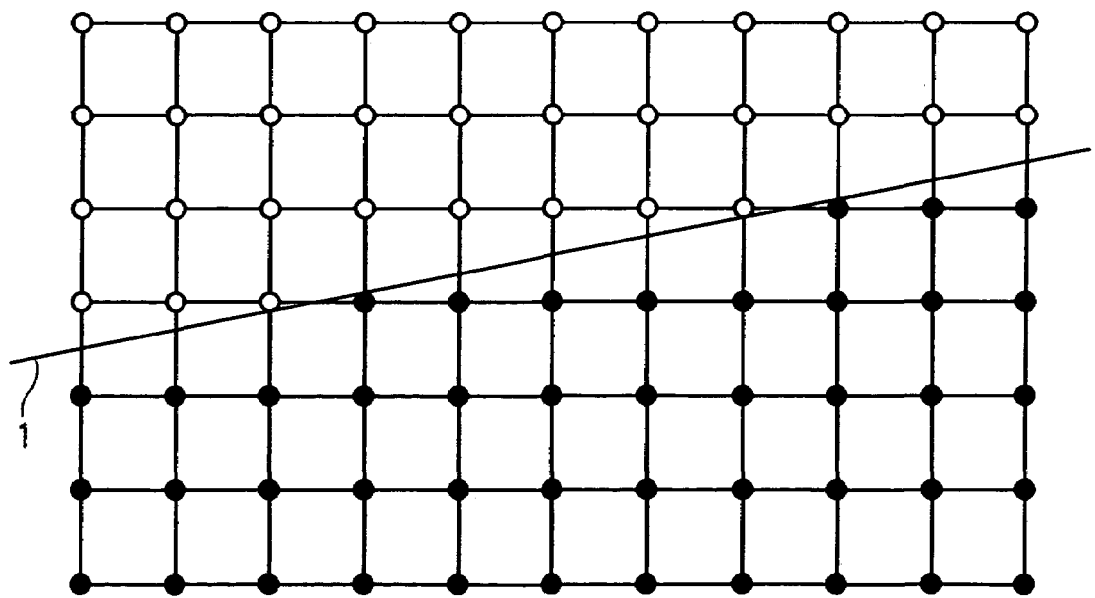

F I G. 5
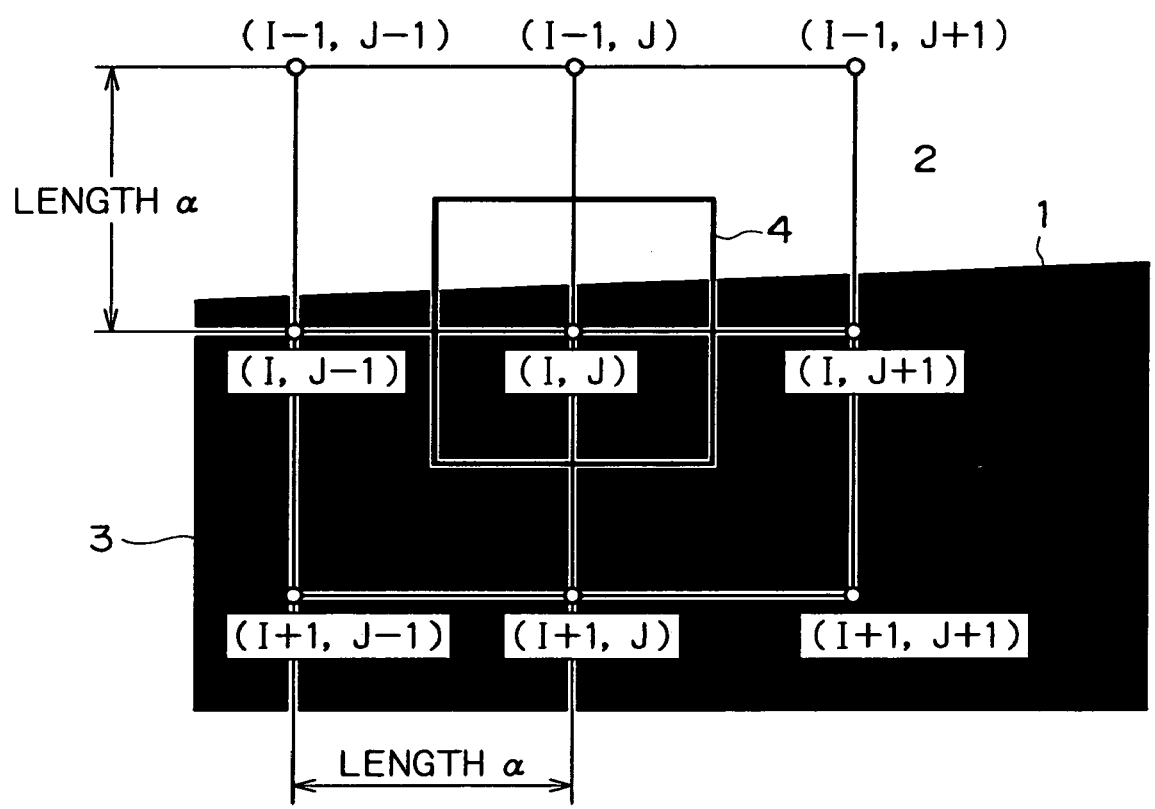

F I G. 10
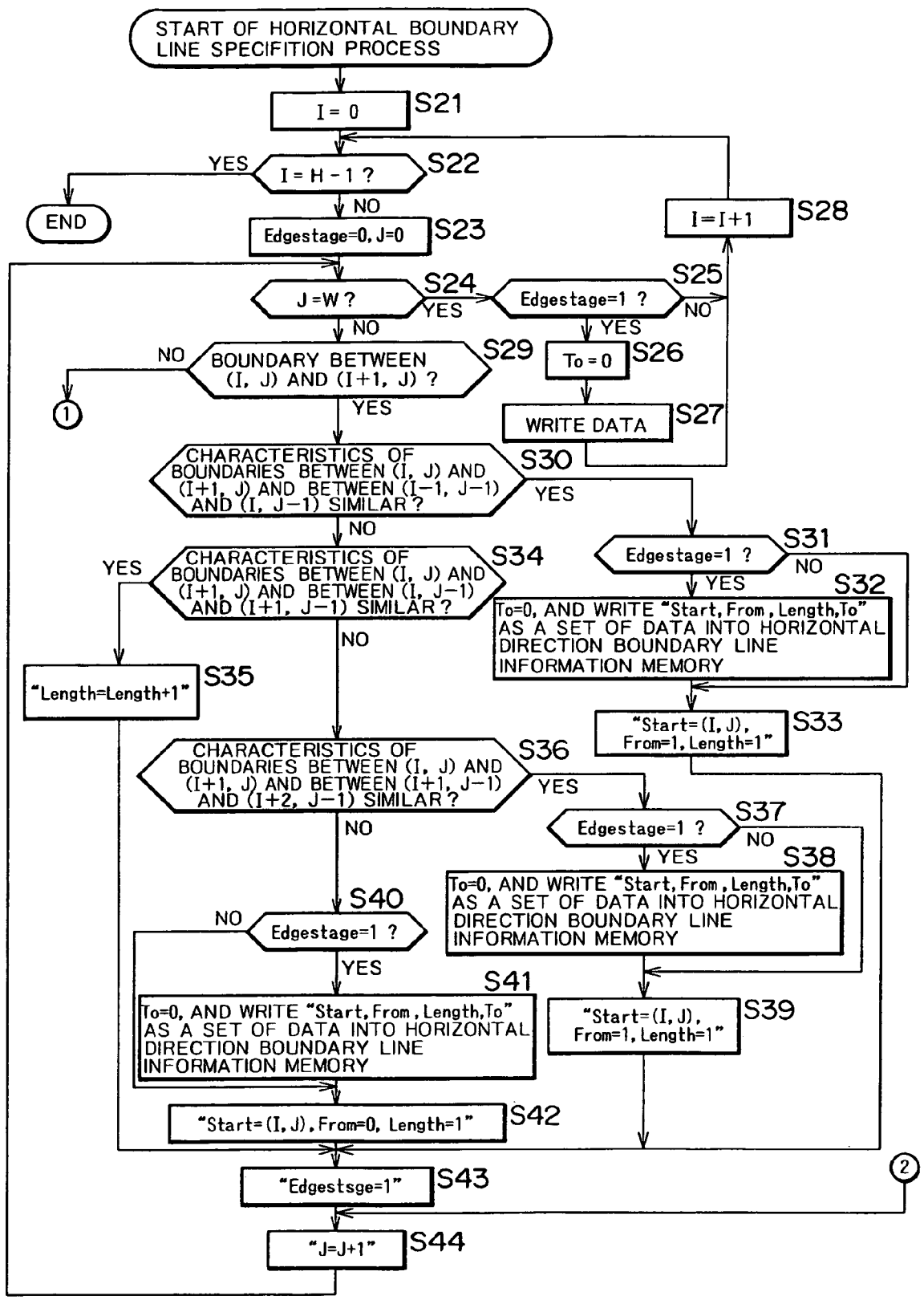

FIG. 20

| VALUE OF From | VALUE OF To | VALUE OF B | DISTANCE FROM (A, B) SIDE |
|---|---|---|---|
| 1 | 1 | B<j+(length/2)−0.5 | 1−(1÷length×(B−j+0.5)) |
| 1 | 1 | B>j+(length/2)−0.5 | 1÷length×(B−j+0.5) |
| 1 | 0 | — | 1−(0.5÷length×(B−j+0.5)) |
| 1 | −1 | — | 1−(1÷length×(B−j+0.5)) |
| 0 | 1 | — | 0.5+(0.5÷length×(B−j+0.5)) |
| 0 | 0 | — | 0 |
| 0 | −1 | — | 0.5−(0.5÷length×(B−j+0.5)) |
| −1 | 1 | — | 1÷length×(B−j+0.5) |
| −1 | 0 | — | 0.5÷length×(B−j+0.5) |
| −1 | −1 | B<j+(length/2)−0.5 | 1÷length×(B−j+0.5) |
| −1 | −1 | B>j+(length/2)−0.5 | 1−(1÷length×(B−j+0.5)) | o = PIXEL OF INPUT IMAGE
□ = PIXEL PRODUCED NEWLY FOR OUTPUT IMAGE o = PIXEL OF INPUT IMAGE
□ = PIXEL PRODUCED NEWLY FOR OUTPUT IMAGE

BOUNDARY LINE DETECTION APPARATUS AND METHOD, AND IMAGE PROCESSING APPARATUS AND METHOD AS WELL AS RECORDING MEDIUM

BACKGROUND OF THE INVENTION

This invention relates to a boundary line detection apparatus and method, and an image processing apparatus and method as well as a recording medium, and more particularly to a boundary line detection apparatus and method, and an image processing apparatus and method as well as a recording medium by which jaggy can be suppressed.

In order to determine image data corresponding to an image to be displayed on a display screen typically of a computer with which a game is played, high accuracy arithmetic operation is executed usually using floating point arithmetic. The display screen is represented with pixels displayed two-dimensionally. In other words, image data are displayed by a set of pixels having designated pixel values, that is, designated color data.

Where image data calculated by a computer represent, for example, such an image composed of a white portion 2 and a black portion 3 divided by an oblique boundary line 1 as shown in FIG. 1, each of pixels for displaying the image has a pixel value of the image data in accordance with its position. Therefore, the pixels included in the white portion 2 have color data of the white and the pixels included in the black portion 3 have color data of the black. Consequently, the pixels have such pixel values as seen in FIG. 2.

FIG. 3 shows the display screen displayed with the pixels shown in FIG. 2. Although the boundary line of the original image data is an oblique straight line, the boundary between the white and black areas on the screen on which it is displayed is displayed in a stepwise shape as seen in FIG. 3. The phenomenon wherein a portion which originally is a straight line is displayed in a stepwise shape in this manner is called jaggy.

In order to solve the problem of the jaggy, pixels in the proximity of the boundary line 1 should be displayed with an intermediate color (in the example shown, gray) of the color data represented by two pixels on the opposite sides of the boundary. In particular, an ideal method for determining a pixel of a display image is to determine, from high accuracy image data arithmetically operated by a computer, an average value of pixel values in the inside of a square 4 centered at a noticed pixel (I, J) and having sides equal to the distance α between pixels of the display image based on the image data as seen in FIG. 5 and use the average value as a pixel value of the display image. An image processing method called supersampling can be used for the calculation.

The supersampling is a method of determining data for a pixel on a screen by dividing the pixel into smaller units called subpixels and using an average value of the subpixels as pixel data of the pixel. For example, one pixel is divided by four in each of vertical and horizontal directions and hence into 16 portions, and rendering is performed for the individual imaginary pixels. Then, an average value of the imaginary pixels obtained by the rendering is used as a pixel value of the pixel. In other words, the juggy is suppressed by raising the sampling rate.

However, if supersampling is executed simply, then the rendering time increases in proportion to the number of sub pixels, and consequently, the time required for image processing increases significantly. Therefore, in such an application in which the image processing speed cannot be reduced such as a game, devices of a high performance must be used for an arithmetic operation section and a storage section, which results in significant increase in cost.

SUMMARY OF THE INVENTION

It is an object of the present invention to provide a boundary line detection apparatus and method, and an image processing apparatus and method as well as a recording medium by which a boundary line can be detected without increasing the sampling rate to remove the jaggy with a simple configuration.

In order to attain the object described above, according to the present invention, the differences between pixel values of a noticed pixel and pixels in the proximity of the noticed pixel are compared with each other to detect a boundary line. Then, the pixel values are weighted based on a positional relationship between the noticed pixel and the boundary line.

More particularly, according to an aspect of the present invention, there is provided a boundary line detection apparatus, comprising storage control means for controlling storage of a plurality of pixels inputted thereto, calculation means for calculating differences between pixel values of the pixels whose storage has been controlled by the storage control means, detection means for detecting presence or absence of a boundary from the differences between the pixel values calculated by the calculation means, and production means for producing information of a boundary line based on the differences between the pixel values calculated by the calculation means and the information of presence or absence of a boundary detected by the detection means.

According to another aspect of the present invention, there is provided a boundary line detection method, comprising a storage control step of controlling storage of a plurality of pixels inputted, a calculation step of calculating differences between pixel values of the pixels whose storage has been controlled by the processing of the storage control step, a detection step of detecting presence or absence of a boundary from the differences between the pixel values calculated by the processing of the calculation step, and a production step of producing information of a boundary line based on the differences between the pixel values calculated by the processing of the calculation step and the information of presence or absence of a boundary detected by the processing of the detection step.

According to a further aspect of the present invention, there is provided a recording medium on which a computer-readable program is recorded, the computer-readable program comprising a storage control step of controlling storage of a plurality of pixels inputted, a calculation step of calculating differences between pixel values of the pixels whose storage has been controlled by the processing of the storage control step, a detection step of detecting presence or absence of a boundary from the differences between the pixel values calculated by the processing of the calculation step, and a production step of producing information of a boundary line based on the differences between the pixel values calculated by the processing of the calculation step and the information of presence or absence of a boundary detected by the processing of the detection step.

In the boundary line detection apparatus and the boundary line detection method as well as the recording medium, a plurality of pixels inputted are stored, and differences between pixel values of the stored pixels are calculated. Then, presence or absence of a boundary is detected from the differences between the pixel values, and information of a boundary line is produced based on the differences between the pixel values and the information of presence or absence of a boundary. Consequently, a boundary line can be detected with a simple configuration without increasing the sampling rate.

According to a still further aspect of the present invention, there is provided an image processing apparatus, comprising storage control means for controlling storage of a plurality of pixels inputted thereto, detection means for detecting presence or absence of a boundary line in the proximity of the pixels whose storage has been controlled by the storage control means, position calculation means for calculating positions of the boundary line with respect to the pixels whose storage has been controlled by the storage control means, weighting means for weighting the pixel values of the pixels in accordance with the positions calculated by the position calculation means, and outputting means for outputting the pixels weighted by the weighting means.

According to a yet further aspect of the present invention, there is provided an image processing method, comprising a storage control step of controlling storage of a plurality of pixels inputted, a detection step of detecting presence or absence of a boundary line in the proximity of the pixels whose storage has been controlled by the processing of the storage control step, a position calculation step of calculating positions of the boundary line with respect to the pixels whose storage has been controlled by the processing of the storage control step, a weighting step of weighting the pixel values of the pixels in accordance with the positions calculated by the position calculation step, and an outputting step of outputting the pixels weighted by the processing of the weighting step.

According to a yet further aspect of the present invention, there is provided a recording medium on which a computer-readable program is recorded, the computer-readable program comprising a storage control step of controlling storage of a plurality of pixels inputted, a detection step of detecting presence or absence of a boundary line in the proximity of the pixels whose storage has been controlled by the processing of the storage control step, a position calculation step of calculating positions of the boundary line with respect to the pixels whose storage has been controlled by the processing of the storage control step, a weighting step of weighting the pixel values of the pixels in accordance with the positions calculated by the position calculation step, and an outputting step of outputting the pixels weighted by the processing of the weighting step.

In the information processing apparatus and the information processing method as well as the recording medium, a plurality of pixels inputted are stored, and presence or absence of a boundary line in the proximity of the pixels is detected. Then, positions of the boundary line with respect to the pixels are calculated, and pixel values of the pixels are weighted in accordance with the calculated positions. Then, the weighted pixels are outputted. Consequently, the jaggy can be removed with a simplified configuration without increasing the sampling rate.

The above and other objects, features and advantages of the present invention will become apparent from the following description and the appended claims, taken in conjunction with the accompanying drawings in which like parts or elements denoted by like reference symbols.

BRIEF DESCRIPTION OF THE DRAWINGS

FIG. 1 is a diagrammatic view showing an example of an image calculated by floating point arithmetic;

FIG. 2 is a diagram illustrating a positional relationship between pixels and a boundary line;

FIG. 5 is a diagrammatic view illustrating a box filter;

FIGS. 10 and 11 are flow charts illustrating a horizontal boundary line specification process:

FIG. 20 is a table illustrating conditions for length calculation and calculation expressions;

DESCRIPTION OF THE PREFERRED EMBODIMENT

Figure 3:
FIG. 3 is a diagrammatic view illustrating jaggy.
Figure 4:
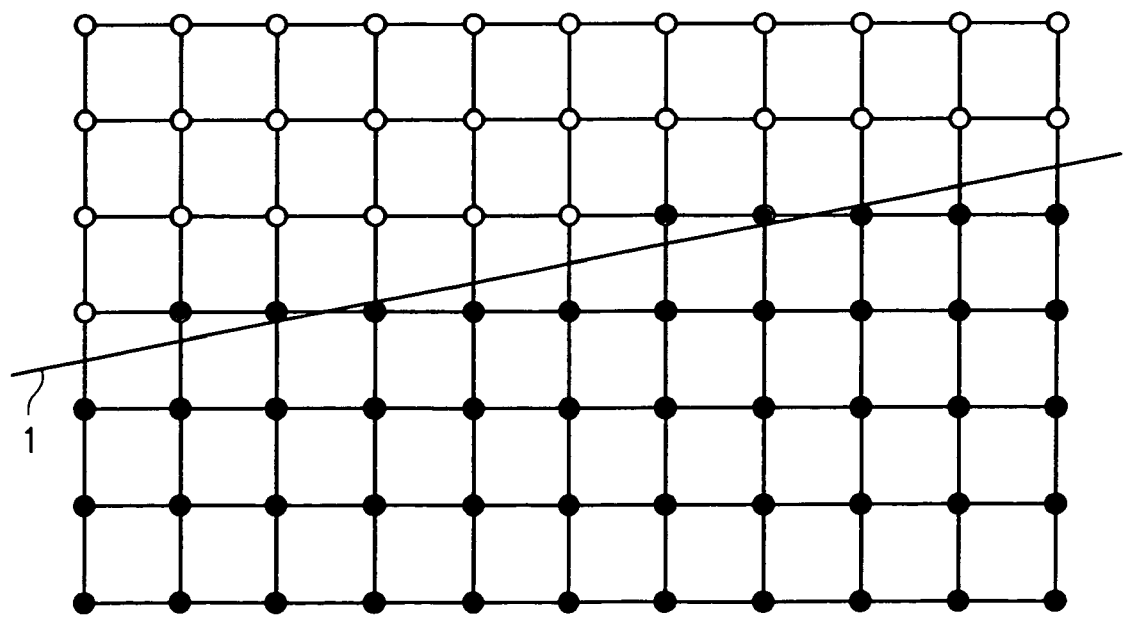
FIG. 4 is a diagram showing output pixels preferable for removing jaggy.
Figure 6:
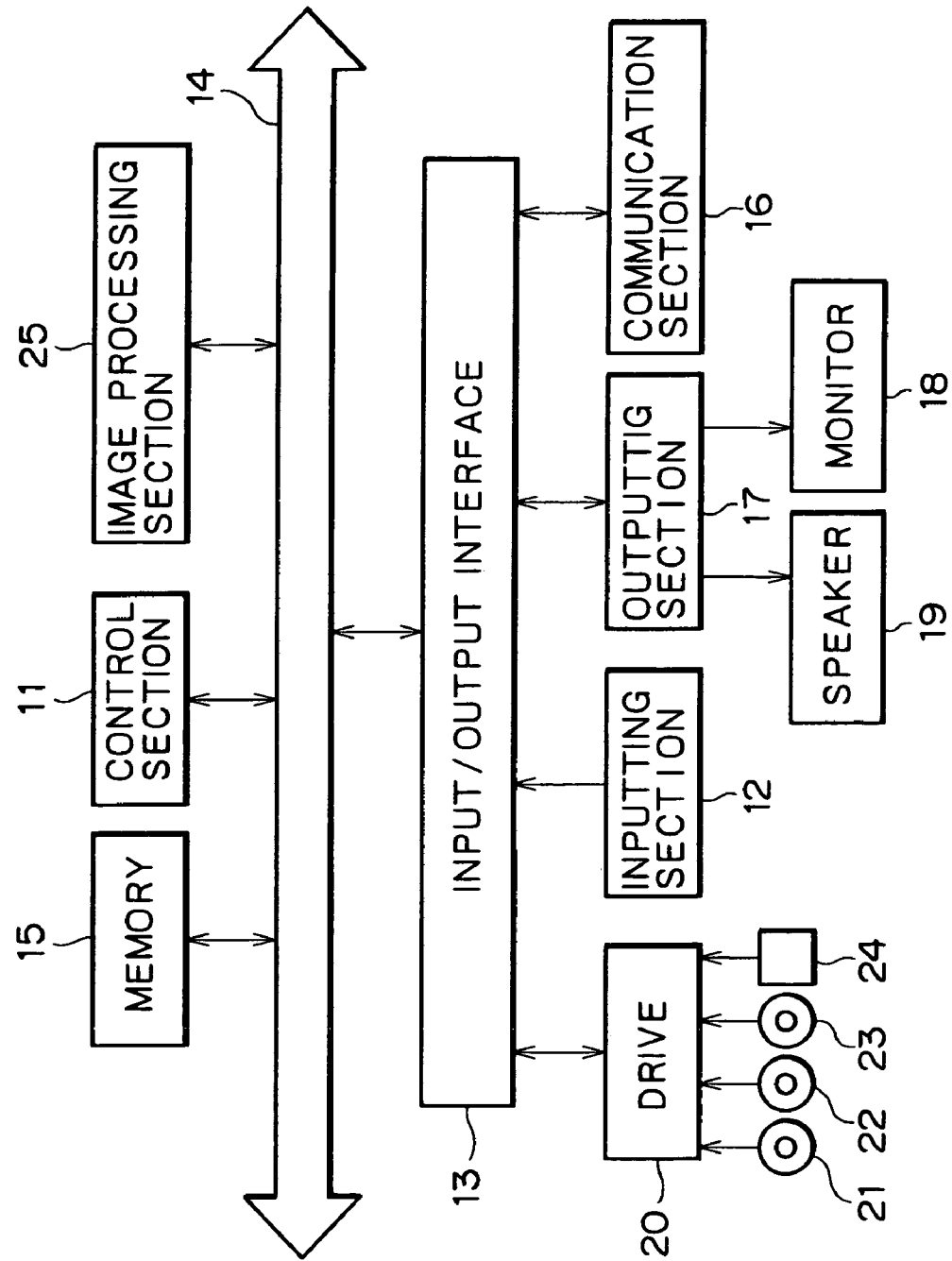
FIG. 6 is a block diagram showing a configuration of an image processing apparatus to which the present invention is applied.

Referring to FIG. 6, there is shown an image processing apparatus to which the present invention is applied. when a user inputs an instruction using an inputting section 12 which may be, for example, a keyboard, a mouse, a joystick and/or various buttons, a control section 11 receives an input of a signal representative of the instruction through an input/output interface 13 and an internal bus 14. The control section 11 executes a program stored in a memory 15, which may typically be a ROM (Read Only Memory) or a RAM (Random Access Memory), in accordance with the inputted signal. Further, the control section 11 stores a program or various data inputted thereto through a network such as the Internet into the memory 15 through a communication section 16 and the internal bus 14. Furthermore, the control section 11 outputs a result of processing thereof to a monitor 18, which may be an LCD (Liquid Crystal Display) unit, typically through the internal bus 14, the input/output interface 13 and an outputting section 17 when necessary so that the result of processing may be displayed on the monitor 18. Where the result of processing is audio data, the control section 11 outputs the audio data to a speaker 19 through the internal bus 14, input/output interface 13 and outputting section 17 so that sound of the audio data may be outputted from the speaker 19.

The memory 15 stores not only a program installed into the information processing apparatus but also data produced typically by processing of the control section 11. Also a drive 20 is connected to the input/output interface 13 so that the input/output interface 13 may transmit or receive data to and from a magnetic disk 21, an optical disk 22, a magneto-optical disk 23 and a semiconductor memory 24.

An image processing section 25 is connected to the internal bus 14 and executes processing, which is hereinafter described, in accordance with a control signal inputted thereto from the control section 11 to convert inputted image data into data suitable for display on the monitor 18.

Figure 7:
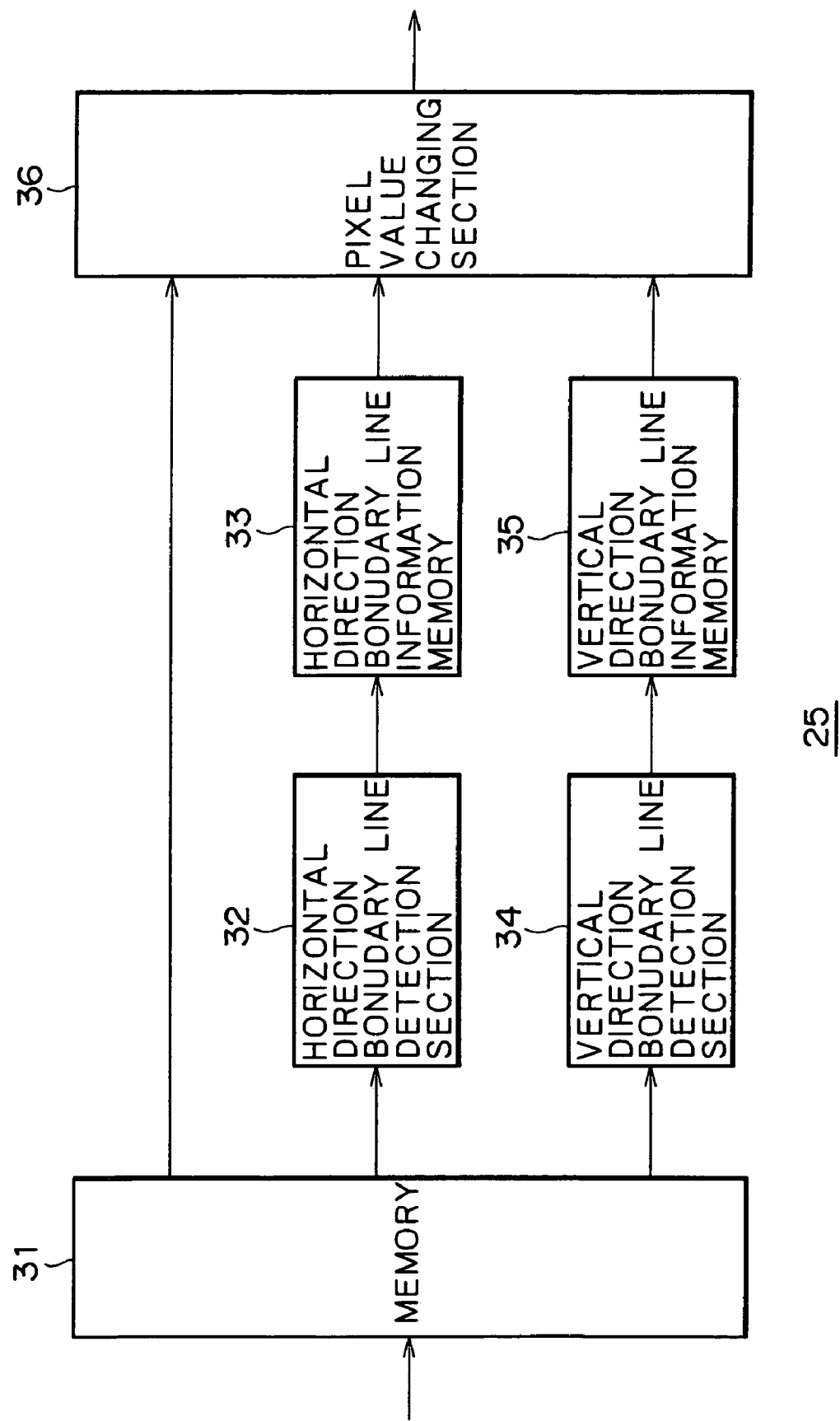
FIG. 7 is a block diagram showing a configuration of an image processing section of the image processing apparatus of FIG. 6.

FIG. 7 shows a detailed configuration of the image processing section 25.

Image data are normally inputted in a raster scan order. In particular, where coordinates of pixels of inputted image data are represented by (I, J), if the number of pixels of image data is totally W×H where W is the number of pixels in the horizontal direction and H is the number of pixels in the vertical direction, then the image data are inputted in order of (0, 0), (0, 1), (0, 2), . . . , (0, W-1), (1, 0), (1, 1), (1, 2), . . . , (1, W-1), . . . , (H-1, 0), (H-1, 1), . . . , (H-1, W-1).

The inputted pixels are temporarily stored into a memory 31, and a horizontal direction boundary line detection section 32 and a vertical direction boundary line detection section 34 individually read in pixel values of necessary one of the pixels from the memory 31. Each of the horizontal direction boundary line detection section 32 and the vertical direction boundary line detection section 34 includes a register for boundary line detection, another register for boundary line specification and a further register for representation of the coordinates of an inputted pixel. The value of the coordinate in the horizontal direction is represented by J, and the value of the coordinate in the vertical direction is represented by I.

Pixels necessary for detection of a boundary line are inputted from the memory 31 to the horizontal direction boundary line detection section 32 in accordance with a control signal inputted from the control section 11. The horizontal direction boundary line detection section 32 executes a process, which is hereinafter described with reference to FIG. 9, to determine an absolute value of the difference between pixel values of two pixels juxtaposed in the vertical direction. The horizontal direction boundary line detection section 32 further executes a process, which is hereinafter described with reference to FIG. 10, to detect a boundary line in the horizontal direction, and stores a result of the detection into a horizontal direction boundary line information memory 33. Also absolute values of the differences between pixel values around a noticed pixel are required for detection of a boundary line. Therefore, the horizontal direction boundary line detection section 32 includes an internal memory not shown and can temporarily store results of calculation of the absolute values of the differences between a plurality of pixel values.

The data to be stored into the horizontal direction boundary line information memory 33 include boundary line information which in turn includes length representative of the length of the boundary line in the horizontal direction, start(X, Y) ((X, Y) represent coordinates of the start position) representative of the start position of the boundary line in the row, From representative of from which direction in another row the boundary line extends (1 represents that the line extends from a left lower direction, -1 represents that the line extends from a left upper direction, and 0 represents that the start point is in the row), and To representative of a direction in which the boundary line extends to another row (1 represents that the boundary line extends to a right lower row, -1 represents that the boundary line extends to a right upper row, and 0 represents that the terminal end of the boundary line is in the row). The data further include a result of the latest processing (processing for the last noticed pixel) and Edgestate representative of whether or not a boundary is present (0 represents that no boundary is present, and 1 represents that a boundary is present).

Figure 8:
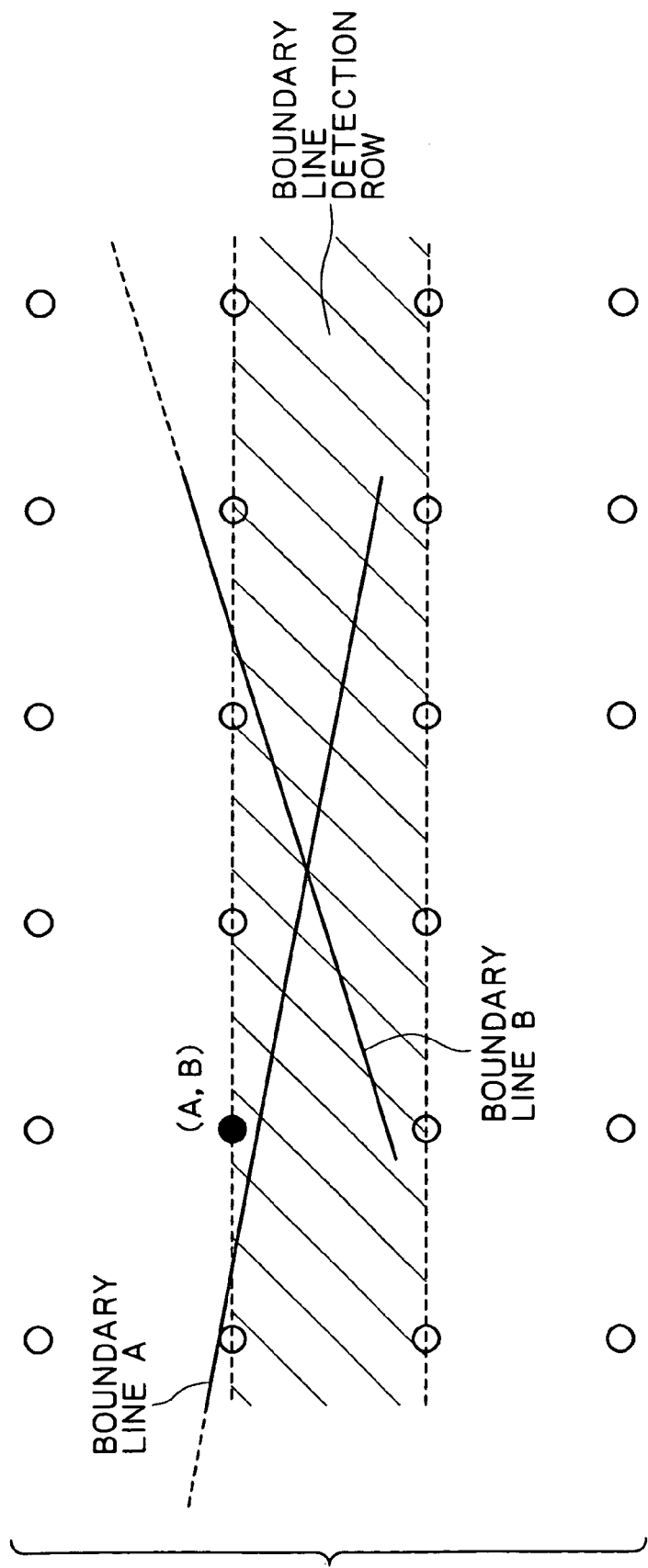
FIG. 8 is a diagrammatic view illustrating a boundary line detection row and boundary line information regarding a noticed pixel.

In particular, when a boundary line is detected with notice taken of a certain boundary line detection row as seen in FIG. 8, for example, the boundary line A is represented by boundary line information of "Start(A, B), From=-1, Length=3, To=0". The boundary line B is represented by boundary line information of "Start(A, B), From=0, Length=2, To=-1".

Referring back to FIG. 7, pixels necessary for detection of a boundary line are inputted from the memory 31 to the vertical direction boundary line detection section 34 in accordance with a control signal inputted from the control section 11. The vertical direction boundary line detection section 34 executes a process, which is hereinafter described with reference to FIG. 9, to determine an absolute value of the difference between pixel values of two pixels juxtaposed in the horizontal direction, executes another process, which is hereinafter described with reference to FIG. 17, to detect a boundary line in the vertical direction, and stores a result of the detection into a vertical direction boundary line information memory 35. Also the vertical direction boundary line detection section 34 includes an internal memory not shown and can temporarily store results of calculation of the absolute values of the differences between a plurality of pixel values.

The Data to be stored into the vertical direction boundary line information memory 35 include boundary line information which in turn includes Prevlength representative of the length of the boundary line in the vertical direction, start(X, Y) representative of the start position of the boundary line in the column, From representative of from which direction in another column the boundary line extends, and To representative of a direction in which the boundary line extends to another column. The data further include a result of the latest processing (processing for the last noticed pixel), Edgestate representative of whether or not a boundary is present, and Noedge=(I, J) representative of coordinates at which no boundary is present.

A pixel value conversion section 36 has, in the inside thereof, a register for detection processing of the distance between a noticed pixel and a boundary line, another register for pixel value conversion processing, and a further register for representing coordinates of an inputted pixel. The register for distance detection stores B which is a value of the coordinate in the horizontal direction and A which is a value of the coordinates in the vertical direction. The register for pixel value conversion stores J which is a value of the coordinate in the horizontal direction and I which is a value of the coordinate in the vertical direction. The pixel value conversion section 36 reads in boundary line information from the horizontal direction boundary line information memory 33 and the vertical direction boundary line information memory 35 and reads in a pixel value inputted from the memory 31. Then, the pixel value conversion section 36 executes a process, which is hereinafter described with reference to FIGS. 21 to 23, to arithmetically operate a pixel value to be outputted, converts the pixel value in accordance with a result of the arithmetic operation, and outputs a result of the conversion.

Figure 9:
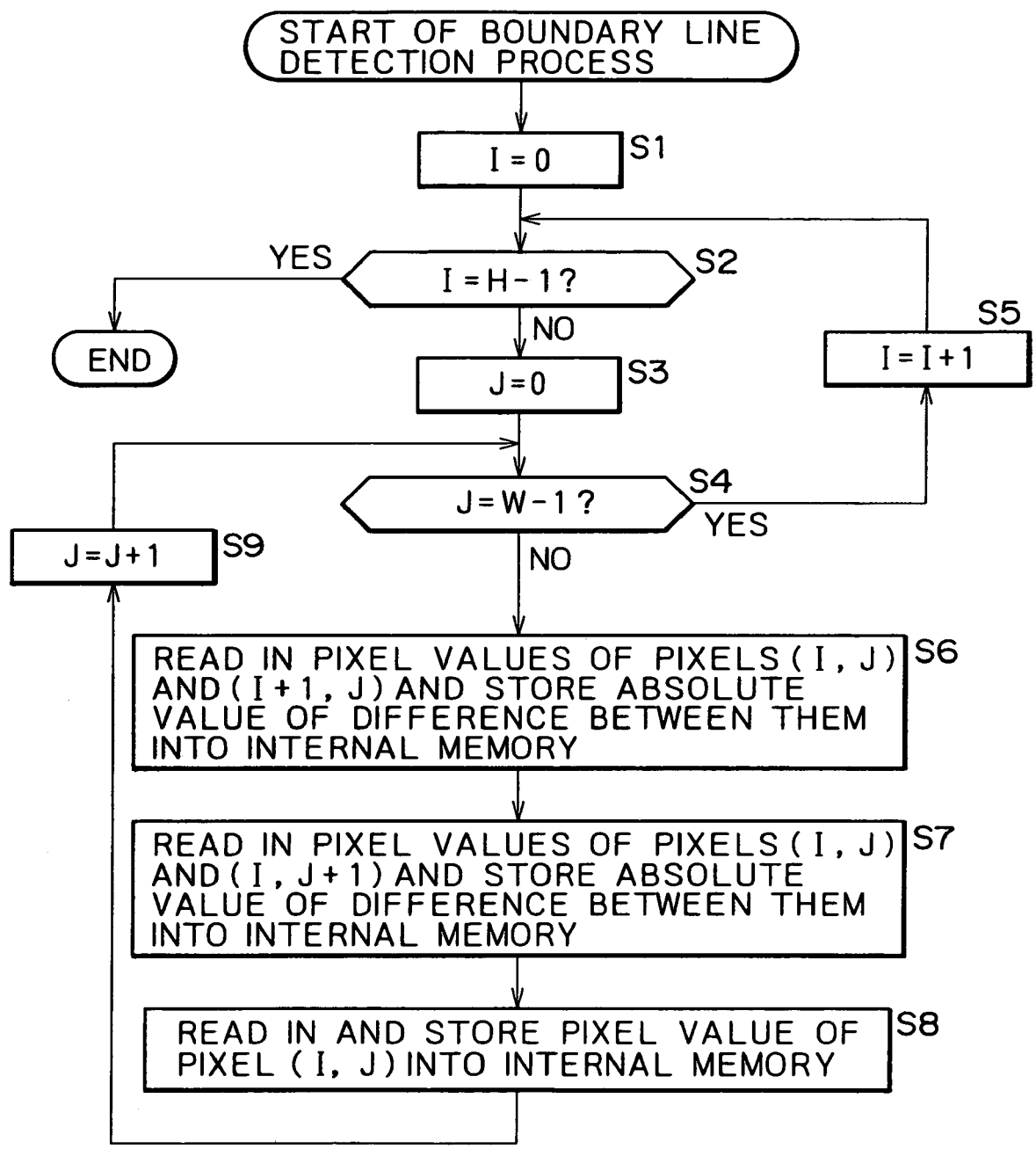
FIG. 9 is a flow chart illustrating a boundary line detection process.

Now, the boundary line detection process is described with reference to a flow chart of FIG. 9. Here, description is given of processing of image data for one frame. However, processing of moving picture data as well can be executed by successively processing a plurality of frames.

In step S1, each of the horizontal direction boundary line detection section 32 and the vertical direction boundary line detection section 34 sets the value of the register for boundary line detection for representation of the vertical coordinate of a pixel to I=0. In step S2, each of the horizontal direction boundary line detection section 32 and the vertical direction boundary line detection section 34 refers to the value I of the register for boundary line detection to discriminate whether or not I=H−1, that is, whether or not processing wherein the noticed pixel is a pixel in the second last row is completed.

If it is discriminated in step S2 that I=H=1, then the processing is ended. On the other hand, if it is not discriminated in step S2 that I=H−1, then the vertical direction boundary line detection section 34 and the horizontal direction boundary line detection section 32 sets the value of the register for representation of the horizontal coordinate of a pixel to J=0.

In step S4, each of the horizontal direction boundary line detection section 32 and the vertical direction boundary line detection section 34 refers to the value J of the register for boundary line detection to discriminated whether or not J=W−1, that is, whether or not processing wherein the noticed pixel is the second last pixel in the row is completed. If it is discriminated in step S4 that J=W−1, then each of the horizontal direction boundary line detection section 32 and the vertical direction boundary line detection section 34 increments the value I of the register for boundary line detection to I+1 in step S5. Thereafter, the processing returns to step S2 so that similar processing to that described above is repeated.

If it is not discriminated in step S4 that J=W−1, then in step S6, the horizontal direction boundary line detection section 32 reads in the pixel (I, J) and the pixel (I+1, J), that is, the noticed pixel and the pixel below the noticed pixel, stored in the memory 31, determines an absolute value of the difference between pixel values of the two pixels, and stores the absolute value into the internal memory.

In step S7, the vertical direction boundary line detection section 34 reads-in the pixel (I, J) and the pixel (I, J+1), that is, the noticed pixel and the pixel on the right-hand side of the noticed pixel, determines an absolute value of the difference between pixel values of the two pixels, and stores the absolute value into the internal memory.

In step S8, the pixel value conversion section 36 reads in the pixel (I, J) and stores the pixel (I, J) into the internal memory.

In step S9, each of the horizontal direction boundary line detection section 32 and the vertical direction boundary line detection section 34 increment the value J of the register for boundary line detection to J+1. Thereafter, the processing returns to step S4 so that similar processing to that described above is repeated.

It is to be noted that, during the boundary line detection process, pixel values of image data for one frame may remain stored in the memory 31, or alternatively the memory 31 may accept an input of a new pixel while outputting pixel values of a noticed pixel and pixels around the noticed pixel to the vertical direction boundary line detection section 34, horizontal direction boundary line detection section 32 and pixel value conversion section 36.

Now, the horizontal boundary line detection process is described with reference to flowcharts of FIGS. 10 and 11.

In step S21, the horizontal direction boundary line detection section 32 sets the value of the register for boundary line specification for representing the coordinate of a pixel in the vertical direction to I=0. In step S22, the horizontal direction boundary line detection section 32 refers to the value I of the register for boundary line specification to discriminate whether or not I =H−1, that is, whether or not processing wherein the noticed pixel is a pixel in the second last row is completed.

If it is discriminated in step S22 that I=H−1, then the processing is ended. However, if it is not discriminated in step S22 that I=H−1, then the horizontal direction boundary line detection section 32 sets the value of Edgestate to 0 and sets the value of the register for boundary line specification to J=0 in step S23.

In step S24, each of the horizontal direction boundary line detection section 32 and the vertical direction boundary line detection section 34 refers to the value J of the register for boundary line detection to discriminate whether or not J=W, that is, whether or not processing wherein the noticed pixel is the last pixel in the row is completed. If it is discriminated in step S24 that J=W, then the horizontal direction boundary line detection section 32 discriminates in step S25 whether or not Edgestate=1, that is, whether or not there is a boundary on the last pixel of the row.

If it is not discriminated in step S25 that Edgestate=1, then the processing advances to step S28. On the other hand, if it is discriminated in step S25 that Edgestate=1, then this signifies that a boundary line extends to the end of the image, that is, the boundary line has a terminal end thereof on the row. Therefore, the vertical direction boundary line detection section 34 and the horizontal direction boundary line detection section 32 set To to To=0 in step S26, and then in step S27, write the boundary line information such as Start(X, Y), From and To into the vertical direction boundary line information memory 35 and the horizontal direction boundary line information memory 33, respectively.

In step S28, each of the horizontal direction boundary line detection section 32 and the vertical direction boundary line detection section 34 sets the value I of the register for boundary line detection to I+1. Thereafter, the processing returns to step S22 so that similar processing to that described above is repeated.

Figure 12:
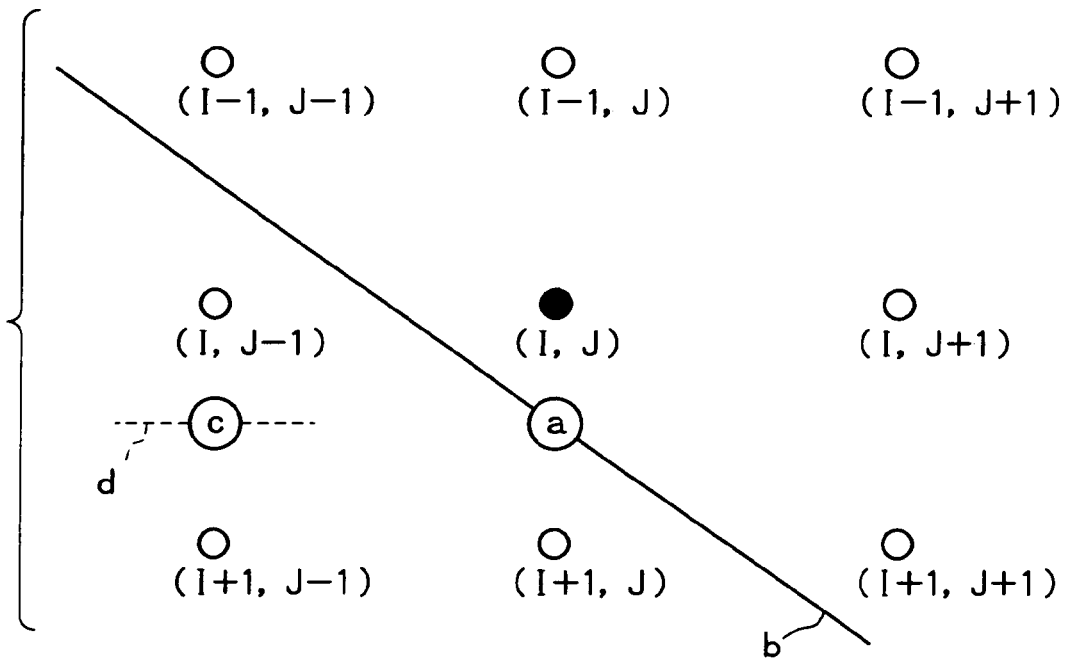
FIGS. 12 to 16 are diagrammatic views illustrating different relationships between a noticed pixel and a boundary line.

If it is not discriminated in step S24 that J=W, then in step S29, the horizontal direction boundary line detection section 32 discriminates from a result of calculation of the absolute value of the difference between pixels stored in the internal memory whether or not there is a boundary between the pixel (I, J) and the pixel (I+1, J), that is, in a portion denoted by a in FIG. 12. For the discrimination, a method may be used wherein, for example, a threshold value is provided for the absolute value of the difference between two pixel values to be compared with each other and is compared with the absolute value of the difference between pixel values. Then, it is discriminated that there is a boundary when the absolute value is equal to or higher than the threshold value, but there is not a boundary when the absolute value is lower than the threshold value. Alternatively, some other discrimination method may be used.

Figure 11:
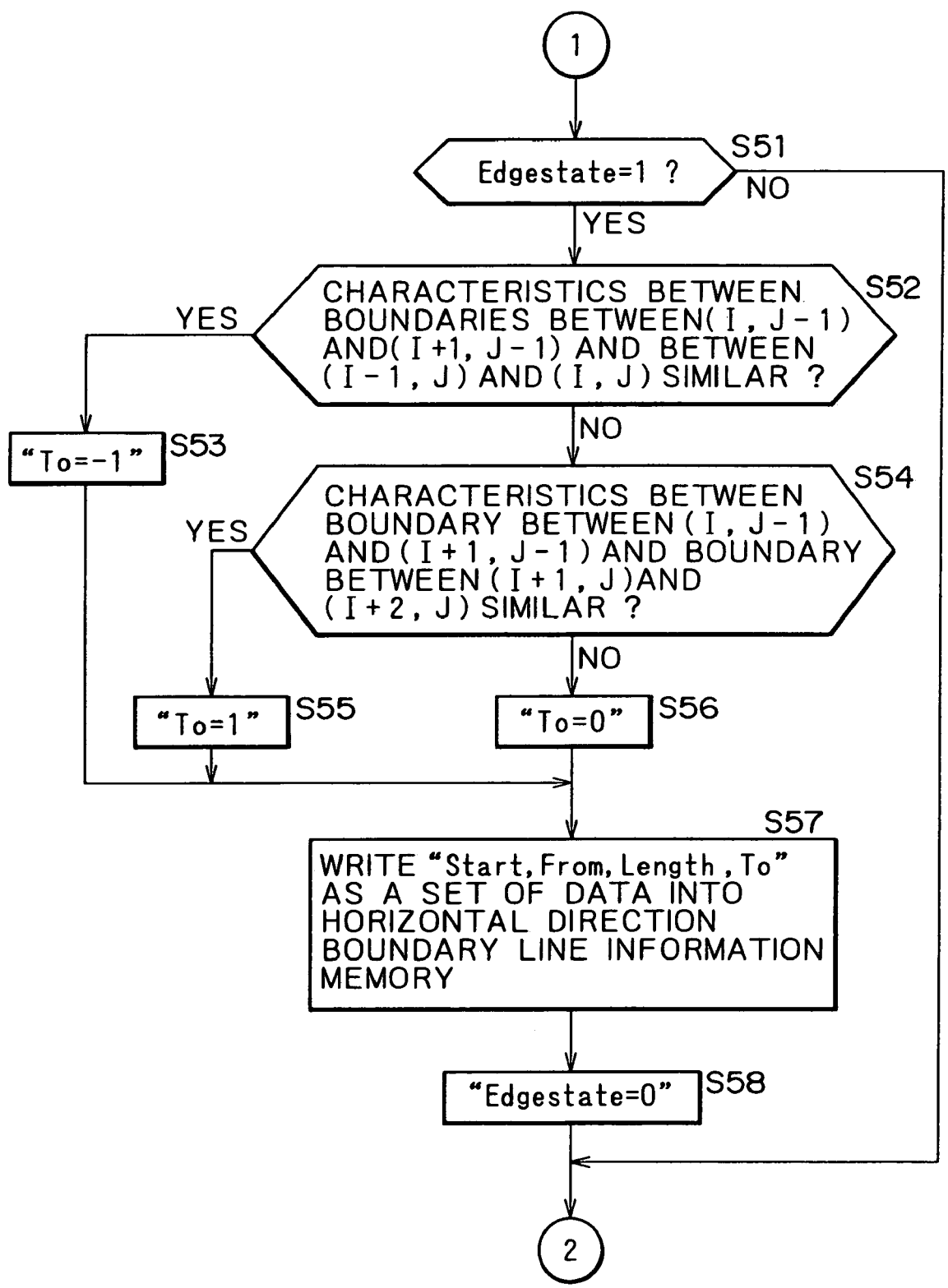

If it is discriminated in step S29 that there is not a boundary, then the processing advances to step S51 of FIG. 11. However, if it is discriminated in step S29 that there is a boundary, then in step S30, the horizontal direction boundary line detection section 32 compares the absolute value of the difference between pixel values of the pixel (I, J) and the pixel (I+1, J) stored in the internal memory and the absolute value of the difference between pixel values of the pixel (I−1, J−1) and the pixel (I, J−1) with each other to discriminate whether or not characteristics of the boundaries between the pixels are similar to each other. Here, since that the characteristics of the boundaries are similar to each other at two places signifies that the boundaries are the same boundary, the operation in step S30 is nothing but discrimination of whether or not there is a boundary line denoted by b in FIG. 12.

If it is discriminated in step S30 that the characteristics of the boundaries between the pixels are not similar to each other, then the processing advances to step S34. On the other hand, if it is discriminated in step S30 that the characteristics of the boundaries between the pixels are similar to each other, then in step S31, the horizontal direction boundary line detection section 32 discriminates whether or not the value of Edgestate stored in the internal memory not shown is 1. In other words, the horizontal direction boundary line detection section 32 discriminates whether or not it was discriminated in the processing for the last noticed pixel that a boundary line was present in an area denoted by c in FIG. 12.

If it is discriminated in step S31 that the value of Edgestate is not 1, then the processing advances to step S33. On the other hand, if it is discriminated in step S31 that the value of Edgestate is 1, then the boundary line d which exists at c of FIG. 12 has its terminal end between c and a. Therefore, in step S32, the horizontal direction boundary line detection section 32 sets To of the boundary line information of the boundary line d existing at c to To=0, which indicates the terminal end, and writes the boundary line information "Start, From, Length, To" representative of the boundary d as a set of data into the horizontal direction boundary line information memory 33.

In step S33, the horizontal direction boundary line detection section 32 records the information of the boundary detected in step S29, that is, "Start(I, J), From=−1, Length=1", into the internal memory not shown. The pixel is a point from which the boundary line starts, but the direction of the boundary line is not known at present. Therefore, the value of To is not set here. Then, the processing advances to step S43.

Figure 13:
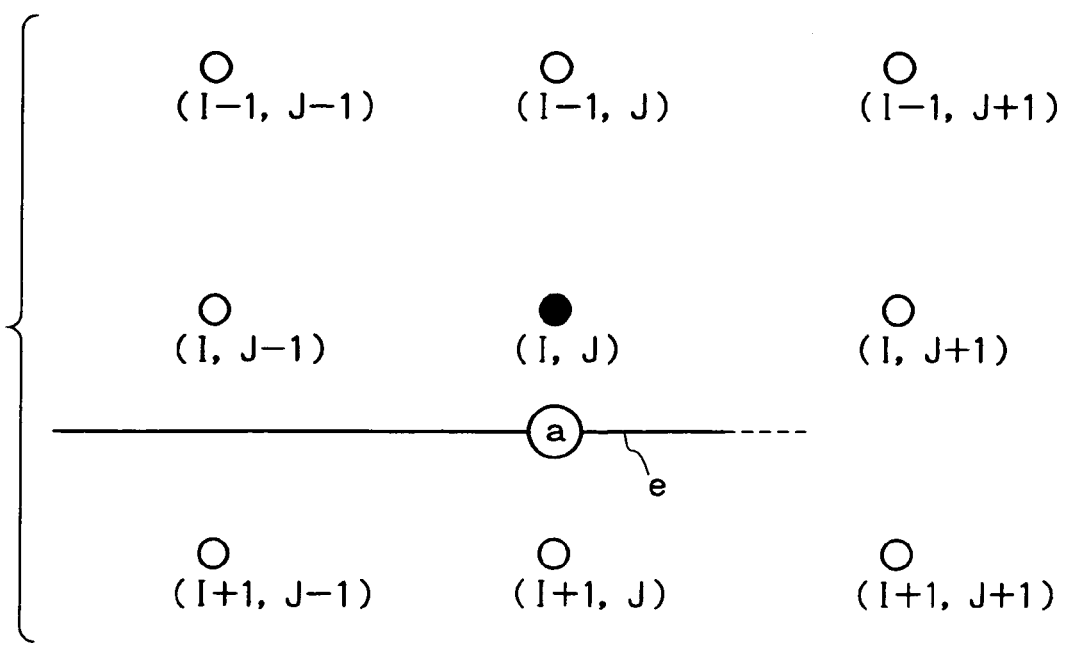

If it is discriminated in step S31 that the characteristics of the boundaries compared with each other are not similar to each other, then in step S34, the horizontal direction boundary line detection section 32 compares the absolute value of the difference between pixel values of the pixel (I, J) and the pixel (I+1, J) stored in the internal memory not shown and the absolute value of the difference between pixel values of the pixel (I, J−1) and the pixel (I+1, J−1) with each other to discriminate whether or not the characteristics of the boundaries between the pixels are similar to each other. This is nothing but discrimination of whether or not a boundary denoted by e in FIG. 13 is present.

If it is discriminated in step S34 that the characteristics of the boundaries between the pixels are similar to each other, then in step S35, the horizontal direction boundary line detection section 32 increments the value of the boundary line information "Length" stored in the internal memory not shown to "Length=Length+1". Then, the processing advances to step S43.

Figure 14:
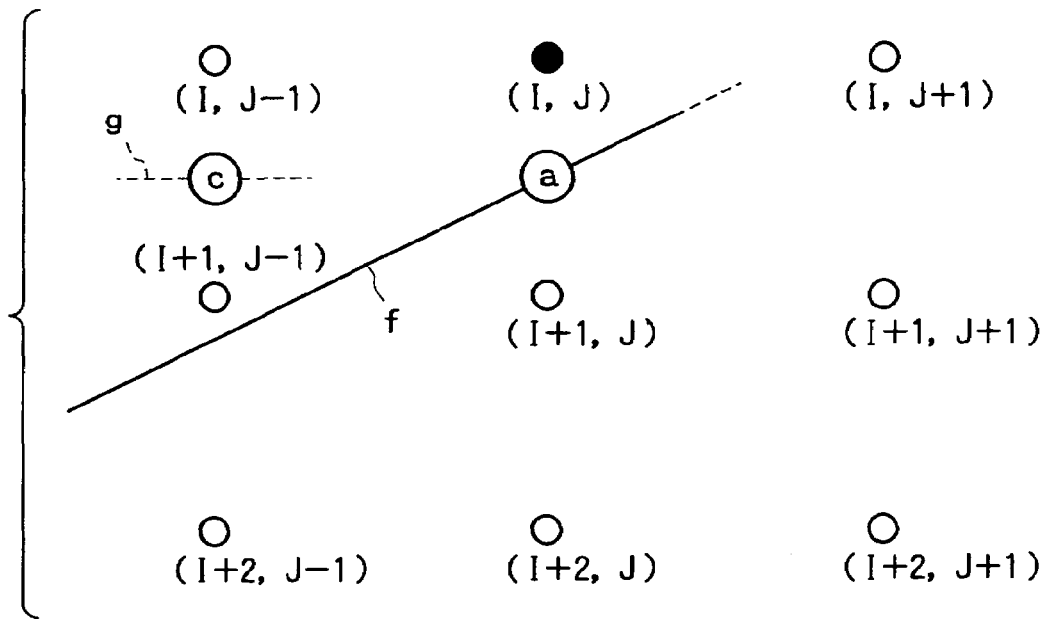

If it is discriminated in step S34 that the characteristics of the boundaries between the pixels are not similar to each other, then in step S36, the horizontal direction boundary line detection section 32 compares the absolute value of the difference between pixel values of the pixel (I, J) and the pixel (I+1, J) stored in the internal memory not shown and the absolute value of the difference between pixel values of the pixel (I+1, J−1) and the pixel (I+2, J−1) with each other to discriminate whether or not the characteristics of the boundaries between the pixels are similar to each other. This is nothing but discrimination of whether or not a boundary denoted by f in FIG. 14 is present.

If it is discriminated in step S36 that the characteristics of the boundaries between the pixels are not similar to each other, then the processing advances to step S40. On the other hand, if it is discriminated in step S36 that the characteristics of the boundaries between the pixels are similar to each other, then in step S37, the horizontal direction boundary line detection section 32 discriminates whether or not the value of Edgestate stored in the internal memory not shown is 1, that is, whether or not it was discriminated in the processing for the last noticed pixel that a boundary line was present in the area indicated by c in FIG. 14.

If it is discriminated in step S37 that the value of Edgestate is not 1, then the processing advances to step S39. On the other hand, if it is discriminated that the value of Edgestate is 1, then the boundary line g which is present in c of FIG. 14 has its terminal end between c and a. Therefore, the horizontal direction boundary line detection section 32 sets To of the boundary line information of the boundary line g existing in c to To=0, which indicates the terminal end. Further, the horizontal direction boundary line detection section 32 writes the boundary line information "Start, From, Length, To" representing the boundary line g as a set of data to into the horizontal direction boundary line information memory 33.

In step S39, the horizontal direction boundary line detection section 32 records the information of the boundary line detected in step S29, that is, "Start(I, J), From=1, Length=1", into the internal memory not shown. This pixel is a point from which the boundary line starts. However, since the direction of the boundary line is not known as yet, the value of To is not set here. Then, the processing advances to step S43.

Figure 15:
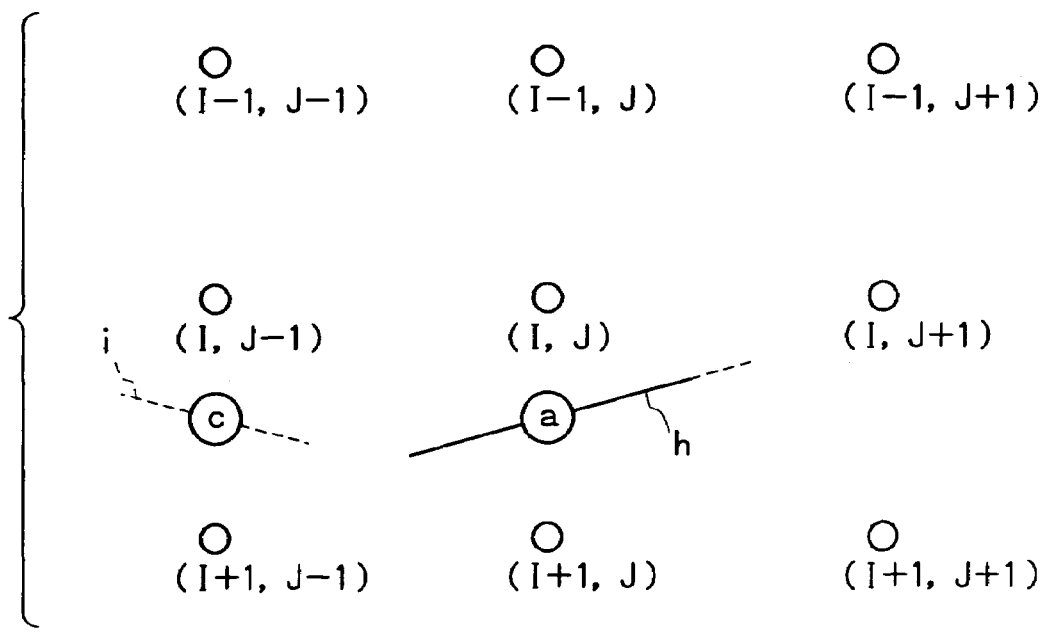

If it is discriminated in step S36 that the characteristics of the boundaries between the pixels are not similar to each other, then since the boundary line detected in step S29 is similar to none of the three pixels positioned on the left-hand side with respect to the noticed pixel, it is discriminated that a new boundary line starts from the pixel. Then in step S40, the horizontal direction boundary line detection section 32 discriminates whether or not the value of Edgestate stored in the internal memory not shown is 1, that is, whether or not it was discriminated in the processing for the last noticed pixel that a boundary line was present in the area denoted by c in FIG. 15.

If it is discriminated in step S40 that the value of Edgestate is not 1, then the processing advances to step S42. On the other hand, if it is discriminated in step S40 that the value of Edgestate is 1, then a boundary line i is present in c of FIG. 15. However, since it has been discriminated in step S34 that the characteristics of the boundaries are not similar to each other, it is discriminated that the boundary line i is different from the boundary line h detected in step S34. Accordingly, the horizontal direction boundary line detection section 32 sets To of the boundary line information of the boundary line i present in c to To=0, which represents the terminal end. Then, the horizontal direction boundary line detection section 32 writes the boundary line information "Start, From, Length, To" representative of the boundary line i as a set of data into the horizontal direction boundary line information memory 33.

In step S42, the horizontal direction boundary line detection section 32 stores the information of the boundary line detected in step S29, that is, "Start(I, J), From=0, Length=1", into the internal memory not shown. The pixel is a point from which the boundary line starts and the direction of the boundary line is not known. Consequently, the value of To is not set here.

In step S43, the horizontal direction boundary line detection section 32 sets the value of Edgestate stored in the internal memory not shown to "Edgestate=1".

In step S44, the horizontal direction boundary line detection section 32 increments the value of J of the register for boundary line detection to J+1. Then, the processing returns to step S24 so that similar processing to that described above is repeated.

Figure 16:
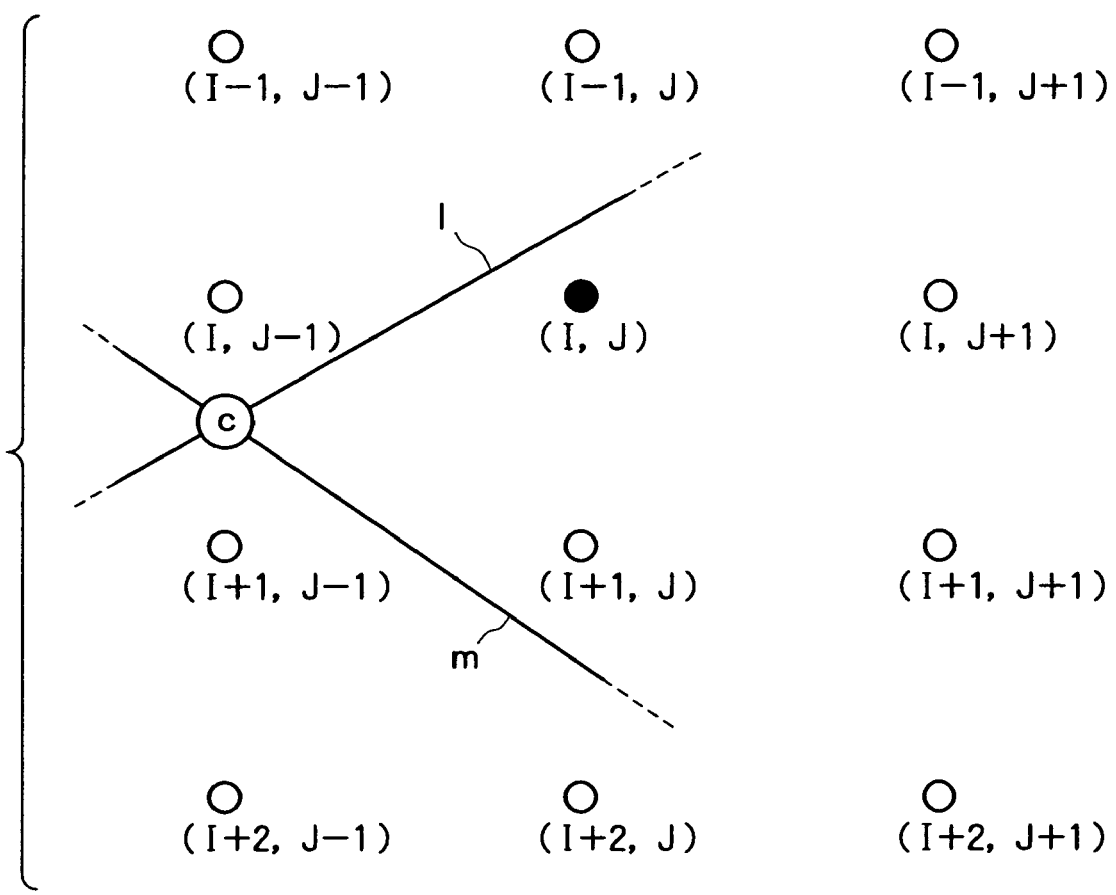

Then, in step S51 of FIG. 11, the horizontal direction boundary line detection section 32 discriminates whether or not the value of Edgestate stored in the internal memory not shown is 1, that is, whether or not it was discriminated in the processing for the last noticed pixel that a boundary line was present in the area denoted by c in FIG. 16.

If it is discriminated in step S51 that the value of Edgestate is not 1, then the processing returns to step S43 of FIG. 10 so that similar processing to that described above is repeated. On the other hand, if it is discriminated in step S51 that the value of Edgestate is 1, then in step S52, the horizontal direction boundary line detection section 32 compares the absolute value of the difference between pixel values between the pixel (I, J−1) and the pixel (I+1, J−1) stored in the internal memory not shown and the absolute value of the difference between pixel values of the pixel (I−1, J) and the pixel (I, J) to discriminate whether or not characteristics of the boundaries between the pixels are similar to each other. This is nothing but discrimination of whether or not there exists a boundary line denoted by 1 in FIG. 16.

If it is discriminated in step S52 that the characteristics of the boundaries between the pixels are similar to each other, then in step S53, the horizontal direction boundary line detection section 32 sets To to To=−1, and then the processing advances to step S57.

On the other hand, if it is discriminated in step S52 that the characteristics of the boundaries between the pixels are not similar to each other, then in step S54, the horizontal direction boundary line detection section 32 compares the absolute value of the difference between pixel values between the pixel (I, J−1) and the pixel (I+1, J−1) stored in the internal memory not shown and the absolute value of the difference between pixel values of the pixel (I+1, J) and the pixel (I+2, J) to discriminate whether or not characteristics of the boundaries between the pixels are similar to each other. This is nothing but discrimination of whether or not there exists a boundary line denoted by m in FIG. 16.

If it is discriminated in step S54 that the characteristics of the boundaries between the pixels are similar to each other, then in step S55, the horizontal direction boundary line detection section 32 sets To to To=1, and the processing advances to step S57.

If it is discriminated in step S52 that the characteristics of the boundaries between the pixels are not similar to each other, then the boundary line which exists between the pixel (I, J−1) and the pixel (I+1, J−1) has its terminal end at the pixel. Therefore, the horizontal direction boundary line detection section 32 sets To to To=0 in step S56.

In step S57, the horizontal direction boundary line detection section 32 writes the boundary line information "Start, From, Length, To" as a set of data into the horizontal direction boundary line information memory 33. In step S58, the horizontal direction boundary line detection section 32 sets Edgestate of the boundary line information to Edgestate=0. Then, the processing returns to step S44 of FIG. 10 so that similar processing to that described hereinabove is repeated.

Figure 17:
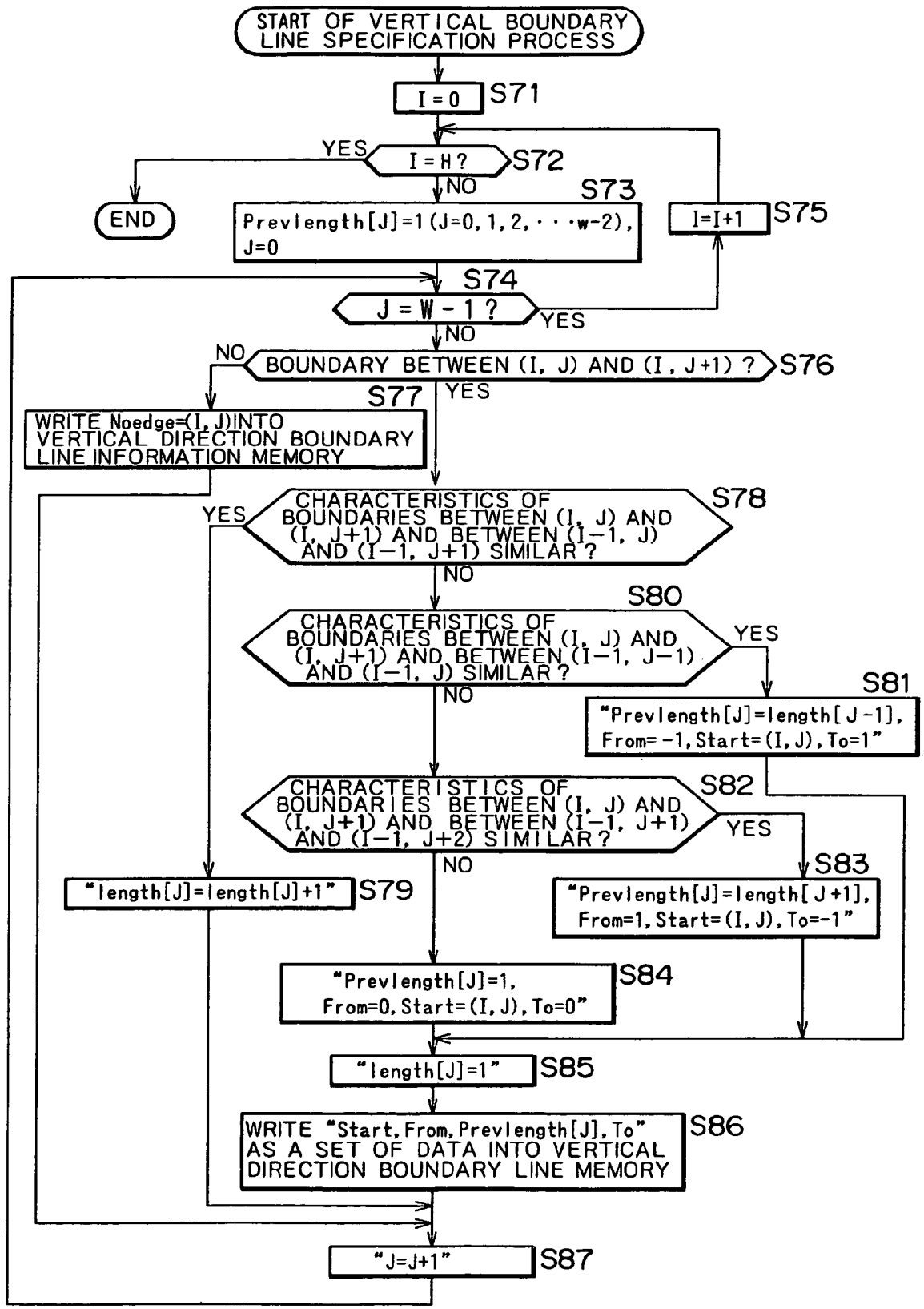
FIG. 17 is a flow chart illustrating a vertical boundary line specification process.

Now, the vertical direction boundary line specification process is described with reference to a flow chart of FIG. 17. If it is tried to execute the vertical direction boundary line specification process as a process similar to the horizontal direction boundary line specification process described hereinabove with reference to FIGS. 10 and 11, since pixels are inputted in the raster scan order into the memory 31, typically where a boundary line extends from the top line to the bottom line, the boundary line cannot be specified until the processing for pixels from the top line to the bottom line is completed. Accordingly, when it is tried to execute the vertical direction boundary line specification process as a process similar to the horizontal direction boundary line specification process described hereinabove with reference to FIGS. 10 and 11, all pixels for one screen must be stored into the memory 31, and therefore, a high memory capacity is required for the memory 31. The vertical direction specification process described below with reference to FIG. 17 estimates a boundary line using processed data in order to reduce the memory capacity.

In step S71, the vertical direction boundary line detection section 34 sets the value of the register for boundary line specification for representing the coordinate of the pixel in the vertical direction to I=0. In step S72, the vertical direction boundary line detection section 34 refers to the value I of the register for boundary line specification to discriminate whether or not I=H, that is, whether or not processing wherein the noticed pixel is a pixel in the last row is completed.

If it is discriminated in step S72 that I=H, then the processing is ended. However, if it is not discriminated in step S72 that I=H, then the vertical direction boundary line detection section 34 sets Plevlength[J] of the boundary line information to Plevlength[J]=1 (J=0, 1, 2, . . . , W−2) and sets the value of the register for boundary line specification to J=0 in step S73.

In step S74, the vertical direction boundary line detection section 34 refers to the value J of the register for boundary line detection to discriminate whether or not J=W−1, that is, whether or not processing wherein the noticed pixel is the second last pixel in the row is completed. If it is discriminated in step S74 that J=W−1, then the vertical direction boundary line detection section 34 increments the value of the register for boundary line specification to I=I+1. Then, the processing returns to step S72 so that processing similar to that described above is repeated.

Figure 18:
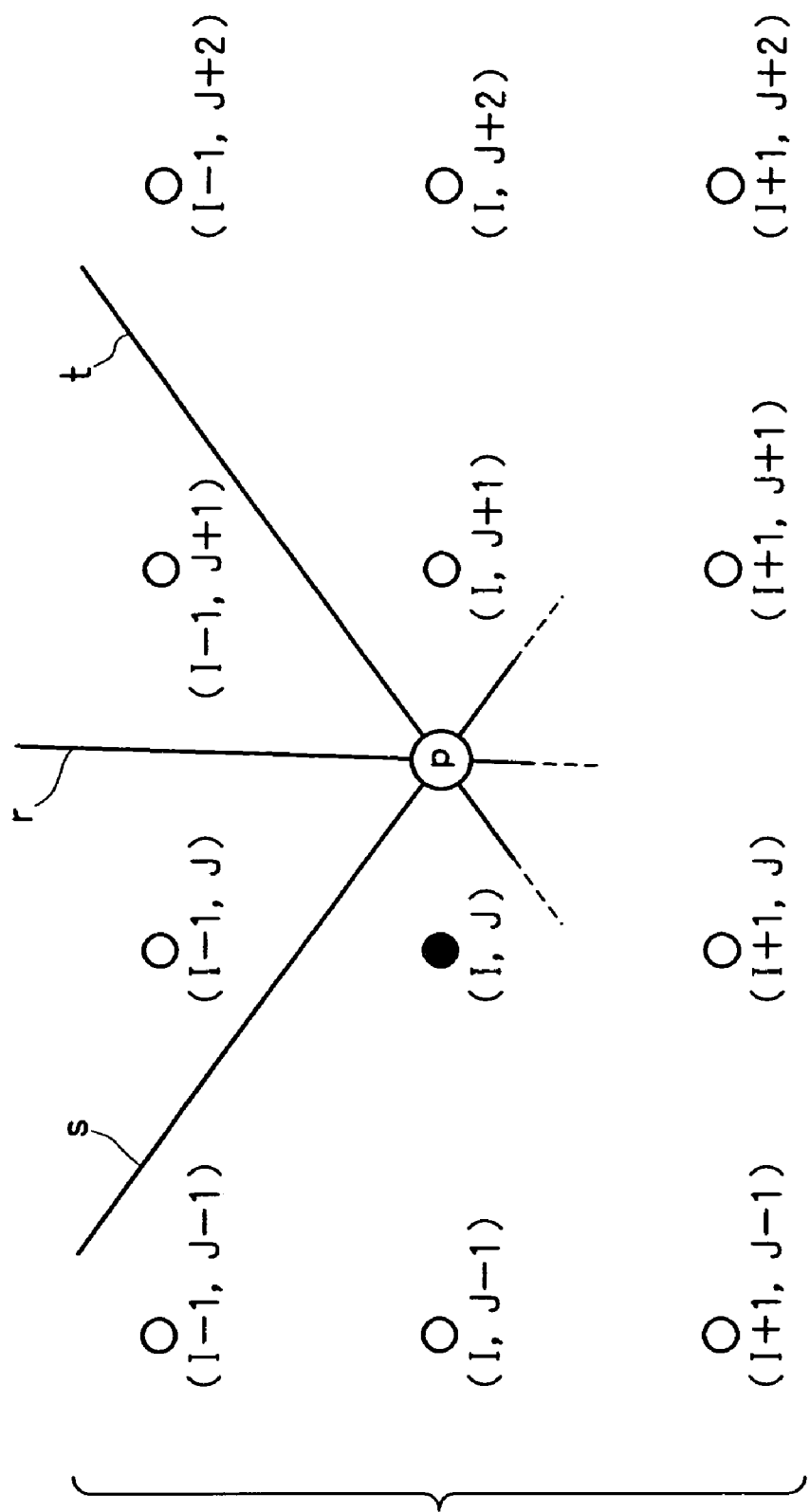
FIG. 18 is a diagrammatic view illustrating a relationship between a noticed pixel and a boundary line.

If it is not discriminated in step S74 that J=W−1, then in step S76, the vertical direction boundary line detection section 34 discriminates from a result of the calculation of the absolute value of the difference between pixels stored in the internal memory whether or not there is a boundary between the pixel (I, J) and the pixel (I, J+1), that is, in a portion denoted by p in FIG. 18.

If it is discriminated in step S76 that there is not a boundary, then in step S77, the vertical direction boundary line detection section 34 writes Noedge =(I, J) into the vertical direction boundary line information memory 35, and then the processing advances to step S87. However, if it is discriminated in step S76 that there is a boundary, then in step S76, the vertical direction boundary line detection section 34 compares the absolute value of the difference between pixel values of the pixel (I, J) and the pixel (I, J+1) stored in the internal memory and the absolute value of the difference between pixel values of the pixel (I−1, J) and the pixel (I−1, J+1) with each other to discriminate whether or not characteristics of the boundaries between the pixels are similar to each other. Here, since that the characteristics of the boundaries at two places are similar to each other signifies that the boundaries are the same boundary, the operation in step S78 is nothing but discrimination of whether or not there is a boundary line denoted by r in FIG. 18.

If it is discriminated in step S78 that the characteristics of the boundaries between the pixels are similar to each other, then the vertical direction boundary line detection section 34 increments the boundary line information length[J] to length [J]=length[J]+1. Then, the processing advances to step S87.

On the other hand, if it is discriminated in step S78 that the characteristics of the boundaries between the pixels are not similar to each other, then in step S80, the vertical direction boundary line detection section 34 compares the absolute value of the difference between pixel values of the pixel (I, J) and the pixel (I, J+1) stored in the internal memory not shown and the absolute value of the difference between pixel values of the pixel (I−1, J−1) and the pixel (I−1, J) with each other to discriminate whether or not the characteristics of the boundaries between the pixels are similar to each other. This is nothing but discrimination of whether or not a boundary line denoted by s in FIG. 18 is present.

If it is discriminated in step S80 that the characteristics of the boundaries between the pixels are similar to each other, then in step S81, the vertical direction boundary line detection section 34 sets the boundary line information to Prevlength[J] =length[J−1], From=−1, Start=(I, J), To=1. Then, the processing advances to step S85.

If it is discriminated in step S80 that the characteristics of the boundaries between the pixels are not similar to each other, then in step S82, the vertical direction boundary line detection section 34 compares the absolute value of the difference between pixel values of the pixel (I, J) and the pixel (I, J+1) stored in the internal memory not shown and the absolute value of the difference between pixel values of the pixel (I−1, J+1) and the pixel (I−1, J+2) with each other to discriminate whether or not the characteristics of the boundaries between the pixels are similar to each other. This is nothing but discrimination of whether or not a boundary denoted by t in FIG. 18 is present.

If it is discriminated in step S82 that the characteristics of the boundaries between the pixels are similar to each other, then in step S83, the vertical direction boundary line detection section 34 sets the boundary line information to Prevlength[J]=length[J+1], From=1, Start=(I, J), To=−1. Then, the processing advances to step S85.

If it is discriminated in step S82 that the characteristics of the boundaries between the pixels are not similar to each other, then this signifies that a boundary line starts from the pixel. Therefore, in step S84, the vertical direction boundary line detection section 34 sets the boundary line information to Prevlength[J]=1, From=0, Start=(I, J), To=1.

Here, the boundary line passes between the noticed pixel and the pixel on the right-hand side of the noticed pixel, that is, the place indicated by p in FIG. 18. In other words, where each row is considered, since the boundary line is started from the place, the vertical direction boundary line detection section 34 sets the value of Length[J] to 1 in step S85.

In step S86, the vertical direction boundary line detection section 34 records the boundary line information "Start, From, Prevlength[J], To" as a set of data into the vertical direction boundary line information memory 35. Then, in step S87, the vertical direction boundary line detection section 34 increments the value of the register for boundary line specification to J=J+1. Then, the processing returns to step S74 so that similar processing to that described above is repeated.

Here, the feature of by what length the preceding boundary line remains in the present column is used to estimate the noticed boundary line. In order to augment the accuracy of estimation, boundary line information of the preceding and second preceding boundary lines may be used to approximate the noticed boundary line with a quadratic expression.

Figure 19:
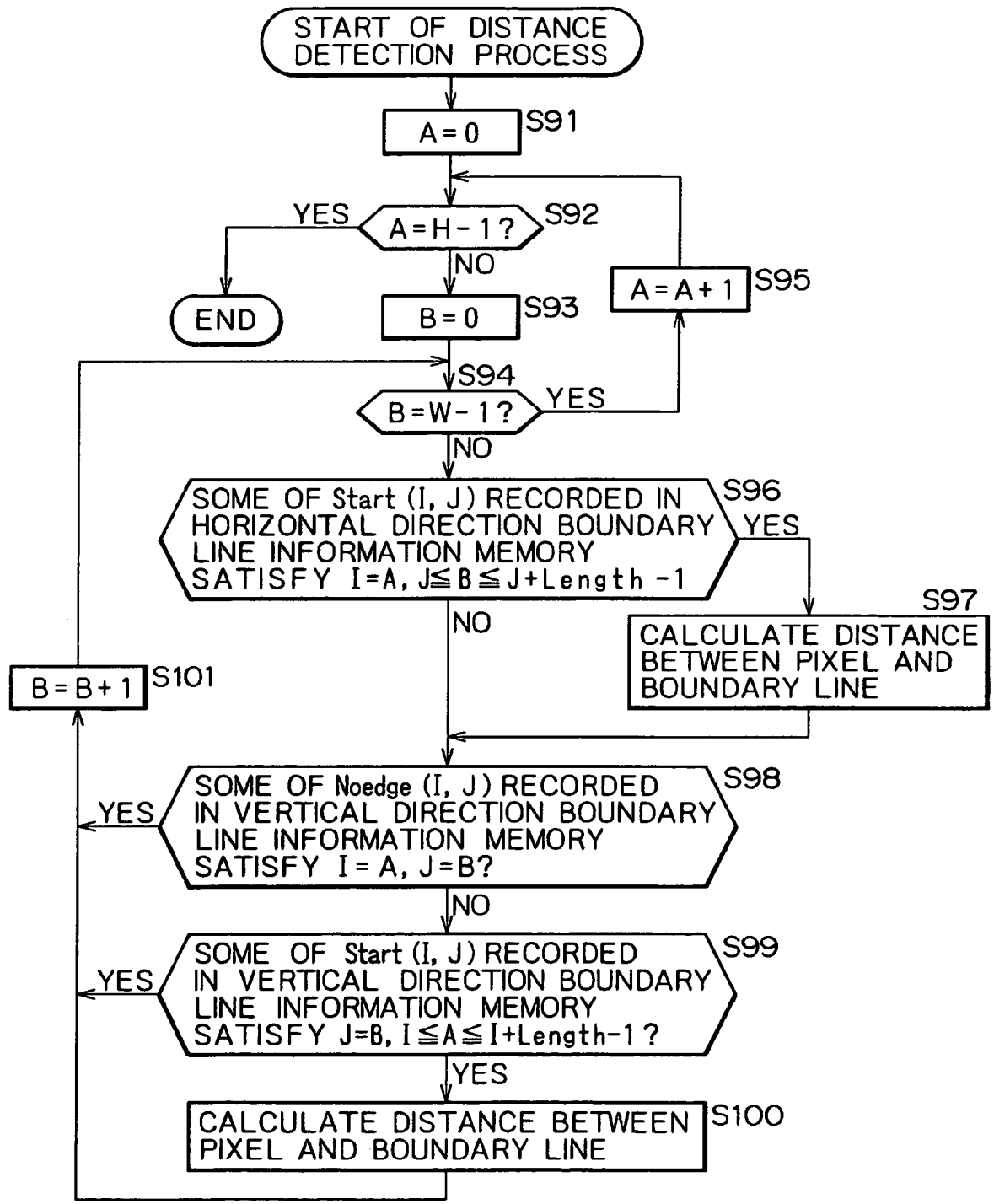
FIG. 19 is a flow chart illustrating a distance detection process.

Now, the distance detection process is described with reference to a flow chart of FIG. 19.

In step S91, the pixel value conversion section 36 sets the value of the register for distance detection for representing the coordinate of the pixel in the vertical direction to A=0. In step S92, the pixel value conversion section 36 refers to the value A of the register for distance detection to discriminate whether or not A=H−1, that is, whether or not processing wherein the noticed pixel is a pixel in the second last row is completed.

If it is discriminated in step S92 that A=H−1, then the processing is ended. On the other hand, if it is not discriminated in step S92 that A=H−1, then in step S93, the pixel value conversion section 36 set the value of the register for distance detection to B=0.

In step S94, the pixel value conversion section 36 refers to the value B of the register for distance detection to discriminate whether or not B=W−1, that is, whether or not the processing wherein the noticed pixel is the second last pixel in the row is completed. If it is discriminated in step S94 that B=W−1, then the pixel value conversion section 36 increments the value A of the register for distance detection to A=A+1 in step S95. Thereafter, the processing returns to step S92 so that similar processing to that described above is repeated.

If it is not discriminated in step S94 that B=W−1, then in step S96, the pixel value conversion section 36 discriminates whether or not some of start(I, J) stored in the horizontal direction boundary line information memory 33 satisfies I=A and J≦B≦J+length−1.

If it is discriminated in step S96 that none of start(I, J) stored in the horizontal direction boundary line information memory 33 satisfies I=A and J≦B≦J+length−1, then the processing advances to step S98. However, if it is discriminated in step S96 that some of start(I, J) stored in the horizontal direction boundary line information memory satisfies I=A and J≦B≦J+length−1, then in step S97, the pixel value conversion section 36 refers to the boundary line information stored in the horizontal direction boundary line information memory 33 to calculate the distance between the pixel and the boundary line, for example, based on such conditions as illustrated in FIG. 20.

In step S98, the pixel value conversion section 36 discriminates whether or not some of noedge(I, J) stored in the vertical direction boundary line information memory 35 satisfies I=A and J=B.

If it is discriminated in step S98 that some of noedge(I, J) satisfies I=A and J=B, then the processing advances to step S101. However, if it is discriminated in step S98 that none of noedge(I, J) satisfies I=A and J=B, then in step S99, the pixel value conversion section 36 discriminates whether or not some of start(I, J) stored in the vertical direction boundary line information memory satisfies J=B and I≦A≦I+length−1.

If it is discriminated in step S99 that none of start(I, J) stored in the vertical direction boundary line information memory 35 satisfies J=B and I≦A≦I+length−1, then the processing advances to step S101. However, if it is discriminated in step S99 that some of start(I, J) stored in the vertical direction boundary line information memory 35 satisfies J=B and I≦A≦I+length−1, then in step S100, the pixel value conversion section 36 refers to the boundary line information stored in the vertical direction boundary line information memory 35 to calculate the distance between the pixel and the boundary line using the conditions that, for example, in FIG. 20, B is changed to A and J is changed to I. However, since the boundary line specification process for the vertical direction uses estimation as described hereinabove with reference to FIG. 17, when the calculation result of the distance is smaller than 0, the distance must be set to 0, but when the calculation result of the distance is equal to or greater than 1, the distance must be set to 1.

In step S101, the pixel value conversion section 36 increments the value of the register for distance calculation to B=B+1. Then, the processing advances to step S94 so that processing similar to that described hereinabove is repeated.

Subsequently, the pixel value conversion process is described with reference to a flow chart of FIG. 21.

In step S111, the pixel value conversion section 36 sets the value of the register for pixel value conversion for representing the coordinate of the pixel in the vertical direction to I=0. In step S112, the pixel value conversion section 36 refers to the value I of the register for pixel value conversion to discriminate whether or not I=H−1, that is, whether or not processing wherein the noticed pixel is a pixel in the second last row is completed.

If it is discriminated in step S112 that I=H−1, then the processing is ended. On the other hand, if it is not discriminated in step S112 that I=H−1, then in step S113, the pixel value conversion section 36 sets the value of the register for pixel value conversion to J=0.

In step S114, the pixel value conversion section 36 refers to the value J of the register for pixel value conversion to discriminate whether or not J=W−1, that is, whether or not the processing wherein the noticed pixel is the second last pixel in the row is completed. If it is discriminated in step S114 that J=W−1, then the pixel value conversion section 36 increments the value of the register for pixel value conversion to I=I+1 in step S115. Thereafter, the processing returns to step S112 so that similar processing to that described above is repeated.

If it is not discriminated in step S114 that I=W−1, then in step S116, the pixel value conversion section 36 refers to the boundary line information stored in the horizontal direction boundary line information memory 33 and the vertical direction boundary line information memory 35 to discriminate whether or not there is a boundary line around the noticed pixel (I, J).

If it is discriminated in step S116 that there is no boundary line around the noticed pixel, then the processing advances to step S118. However, if it is discriminated in step S116 that there is a boundary line around the noticed pixel, then in step S117, the pixel value conversion section 36 refers to the boundary line information stored in the horizontal direction boundary line information memory 33 and the vertical direction boundary line information memory 35 to discriminate whether or not there is a boundary line at least on one of the left- and right-hand sides of the noticed pixel and besides there is a boundary line at least on one of the upper and lower sides of the noticed pixel.

When it is discriminated in step S116 that there is no boundary line around the noticed pixel and when it is discriminated that there is a boundary line at least on one of the left- and right-hand sides of the noticed pixel and besides there is a boundary line at least on one of the upper and lower sides of the noticed pixel, either there is no boundary line around the noticed pixel or, even if there is a boundary line around the noticed pixel, it is complicated in geometry. Consequently, even if the noticed pixel is outputted with the pixel value as it is then, it does not have any influence on the output image. Therefore, in step S118, the pixel value conversion section 36 outputs the pixel (I, J) read in in step S8 of FIG. 9 as it is.

If it is discriminated in step S117 that there is no boundary line on the left- and right-hand sides of the notice pixel or there is no boundary line on the upper and lower sides of the noticed pixel, then in step S119, the pixel value conversion section 36 discriminates whether or not there is a boundary line on at least one of the left- and right-hand sides of the noticed pixel and besides there is no boundary line on the upper and lower sides of the noticed pixel.

If it is discriminated in step S119 that there is a boundary line on at least one of the left- and right-hand sides of the noticed pixel and besides there is a boundary line on any of the upper and lower sides of the noticed pixel, then no boundary line is present on the left- and right-hand sides of the noticed pixel and a boundary line is present above on one of the upper and lower sides of the noticed pixel. Therefore, in step S120, the pixel value conversion section 36 executes a pixel value calculation process 1, which is hereinafter described with reference to FIG. 22, and thereafter, the processing advances to step S122.

Figure 23:
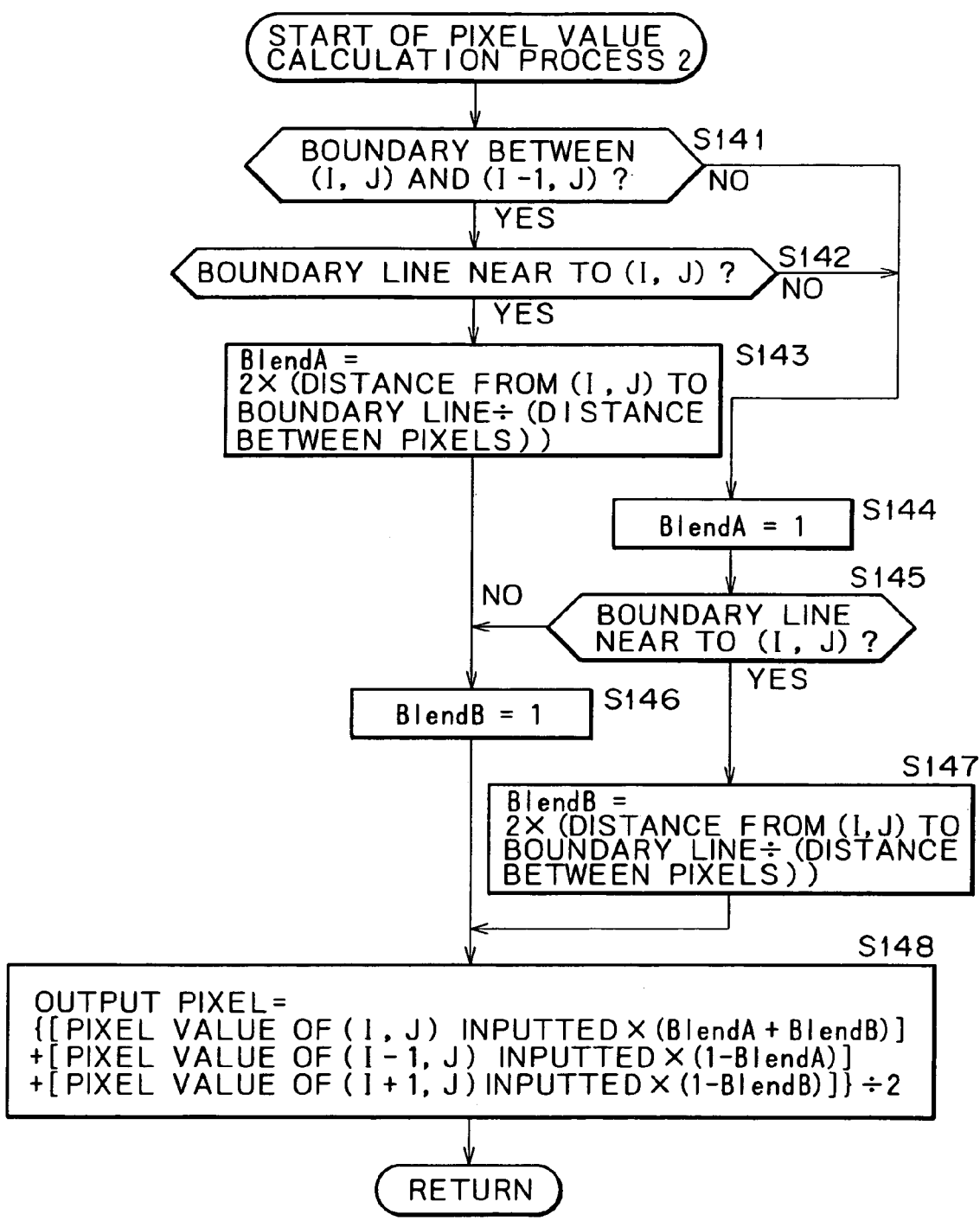
FIG. 23 is a flow chart illustrating a pixel value calculation process 2 of FIG. 21.

If it is discriminated in step S119 that there is a boundary line on at least one of the left- and right-hand sides of the noticed pixel and besides there is no boundary line on the upper and lower sides of the noticed pixel, then in step S121, the pixel value conversion section 36 executes a pixel value calculation process 2, which is hereinafter described with reference to FIG. 23, and thereafter, the processing advances to step S122.

In step S122, the pixel value conversion section 36 outputs a pixel value obtained by the conversion in step S120 or S121, and in step S123, the pixel value conversion section 36 increments the value of the register for pixel value conversion to J=J+1. Thereafter, the processing returns to step S114 so that similar processing to that described above is repeated.

Figure 21:
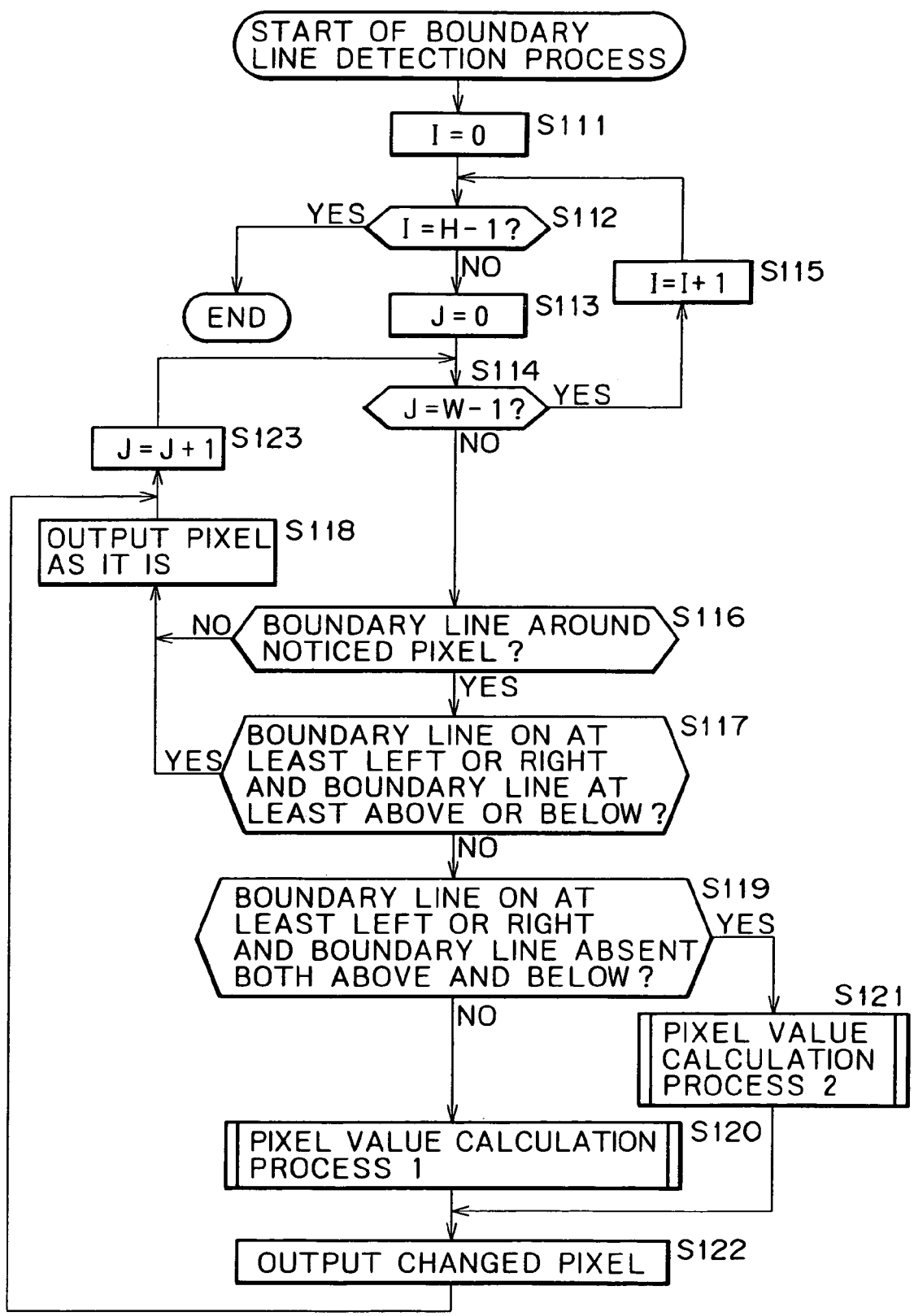
FIG. 21 is a flow chart illustrating a boundary line detection process.
Figure 22:
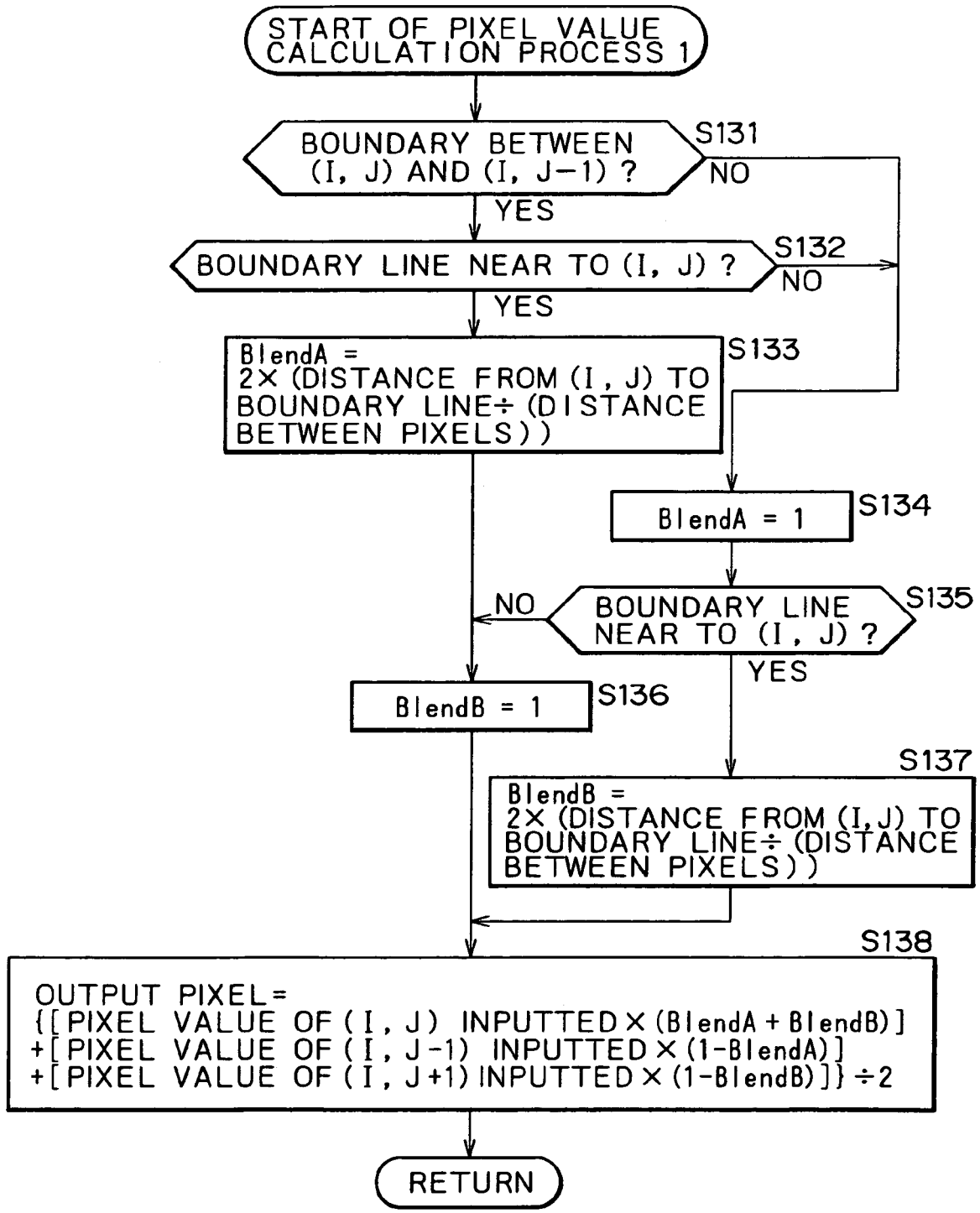
FIG. 22 is a flow chart illustrating a pixel value calculation process 1 of FIG. 21.

Now, the pixel value calculation process 1 in step S120 of FIG. 21 is described with reference to a flow chart of FIG. 22. Here, values BlendA and BlendB are used to perform weighting for a pixel value.

In step S131, the pixel value conversion section 36 discriminates whether or not a boundary line is present between the pixels (I, J) and (I, J+1).

If it is discriminated in step S131 that no boundary line is present between (I, J) and (I, J+1), then this signifies that a boundary line is present between (I, J) and (I, J−1), and the processing advances to step S134. On the other hand, if it is discriminated in step S131 that a boundary line is present between (I, J) and (I, J+1), then in step S132, the pixel value conversion section 36 refers to a result of the distance detection process described hereinabove with reference to FIG. 19 to discriminate whether or not the boundary line is nearer to (I, J).

If it is discriminated in step S132 that the boundary line is farther from (I, J), then the processing advances to step S134. However, if it is discriminated in step S132 that the boundary line is nearer to (I, J), then in step S133, the pixel value conversion section 36 calculates BlendA in accordance with BlendA =2×(distance from (I, J) to boundary line÷(distance between pixels)).

When it is discriminated in step S131 that no boundary line is present between (I, J) and (I, J+1) or when it is discriminated in step S132 that the boundary line is farther from (I, J), the pixel value conversion section 36 sets BlendA to BlendA=1 in step S134.

In step S135, the pixel value conversion section 36 discriminates whether or not the boundary line between (I, J) and (I, J−1) is nearer to (I, J) If it is discriminated in step S135 that the boundary line between (I, J) and (I, J−1) is farther from (I, J), then in step S136, the pixel value conversion section 36 sets BlendB to BlendB=1. However, it is discriminated in step S135 that the boundary line between (I, J) and (I, J−1) is nearer to (I, J), then in step S137, the pixel value conversion section 36 set BlendB to BlendB=2×(distance from (I, J) to boundary line÷(distance between pixels)).

In step S138, the pixel value conversion section 36 calculates the pixel value of the output image in accordance with output pixel ={[pixel value of (I, J) inputted×(BlendA +BlendB)]+[pixel value of (I, J−1) inputted×(1−BlendA)]+ [pixel value of (I, J+1) inputted×(1−BlendB)]}÷2. Then, the processing advances to step S122 of FIG. 21.

Subsequently, the pixel value calculation process 2 in step S121 of FIG. 21 is described with reference to a flow chart of FIG. 23. Also here, values BlendA and BlendB are used to perform weighting for a pixel value.

In step S141, the pixel value conversion section 36 discriminates whether or not a boundary line is present between the pixels (I, J) and (I−1, J).

If it is discriminated in step S141 that no boundary line is present between (I, J) and (I−1, J), then this signifies that a boundary line is present between (I, J) and (I+1, J), and the processing advances to step S144. On the other hand, if it is discriminated in step S141 that a boundary line is present between (I, J) and (I−1, J), then in step S142, the pixel value conversion section 36 refers to a result of the distance detection process described hereinabove with reference to FIG. 19 to discriminate whether or not the boundary line is nearer to (I, J).

If it is discriminated in step S142 that the boundary line is farther from (I, J), then the processing advances to step S144. However, if it is discriminated in step S142 that the boundary line is nearer to (I, J), then in step S143, the pixel value conversion section 36 calculates BlendA in accordance with BlendA=2×(distance from (I, J) to boundary line÷(distance between pixels)).

When it is discriminated in step S141 that no boundary line is present between (I, J) and (I−1, J) or when it is discriminated in step S142 that the boundary line is farther from (I, J), the pixel value conversion section 36 sets BlendA to BlendA=1 in step S144.

In step S145, the pixel value conversion section 36 discriminates whether or not the boundary line between (I, J) and (I+1, J) is nearer to (I, J) If it is discriminated in step S145 that the boundary line is farther from (I, J), then in step S146, the pixel value conversion section 36 sets BlendB to BlendB=1. However, if it is discriminated in step S145 that the boundary line is nearer to (I, J), then in step S147, the pixel value conversion section 36 sets BlendB to BlendB=2× (distance from (I, J) to boundary line÷(distance between pixels)).

In step S148, the pixel value conversion section 36 calculates the pixel value of the output image in accordance with output pixel={[pixel value of (I, J) inputted×(BlendA+ BlendB)]+[pixel value of (I−1, J) inputted33 (1−BlendA)]+ [pixel value of (I+1, J) inputted×(1−BlendB)]}−2. Then, the processing advances to step S122 of FIG. 21.

As described hereinabove with reference to FIG. 5, the jaggy can be removed if an average value of pixel values in the inside of a square 4 centered at a noticed pixel (I, J) and having sides equal to the distance a between pixels of the display image and the average value is used as a pixel value of the display image. Thus, the processing of determining weighting of a pixel value of black and white in accordance with the position of the noticed pixel in the square 4 corresponds to the steps S143 and S146 of FIG. 23 or the steps S144 and S147. Then, the processing of determining an average value of pixel values in the square 4 corresponds to the step S148. It is to be noted that, as can be seen also from the flow chart of FIG. 23, where changing of a pixel value should not be performed (for example, where a boundary line passes the center between pixels), the values of BlendA and BlendB are set to 1, and consequently, substantially no changing of the pixel value is performed in step S148.

The pixel values of inputted pixels are converted by the processing described above so that no jaggy appears when they are displayed, and the pixel values obtained by the conversion are outputted. While, in the example described, weighting is performed based on the distance between a noticed pixel and a boundary line, weighting may be performed based on some other factor.

It is to be noted that the processing described above can be applied also to a case wherein, for example, the number of output pixels in the vertical direction is set twice that of input pixels to produce a progressive image (an image obtained by scanning all rows) from an interlace image (image obtained by scanning only odd-numbered rows).

Figure 24A:
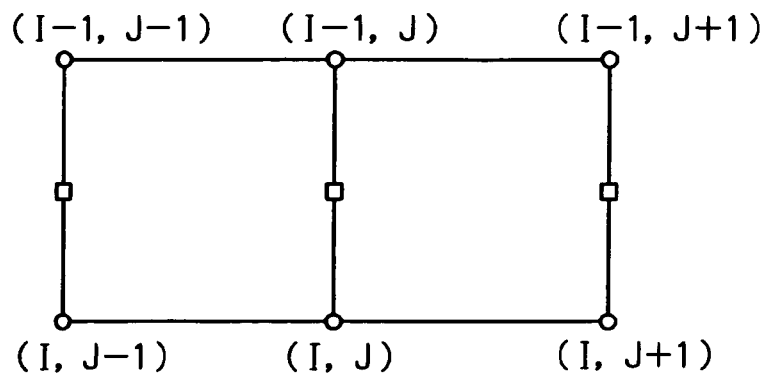
FIGS. 24A, 24B and 25 are diagrammatic views illustrating a process for producing a progressive image from an interlace image.

In this instance, the distance between output pixels is equal to that between input pixels in the horizontal direction but one half that between input pixels in the vertical direction. The pixel value of α pixel to be produced newly in order to output a progressive image is defined as an average value of pixel values of a pixel just above and another pixel just below the pixel to be produced newly where no boundary line is present around the pixel to be produced newly (in the case of FIG. 24A).

Figure 24B:
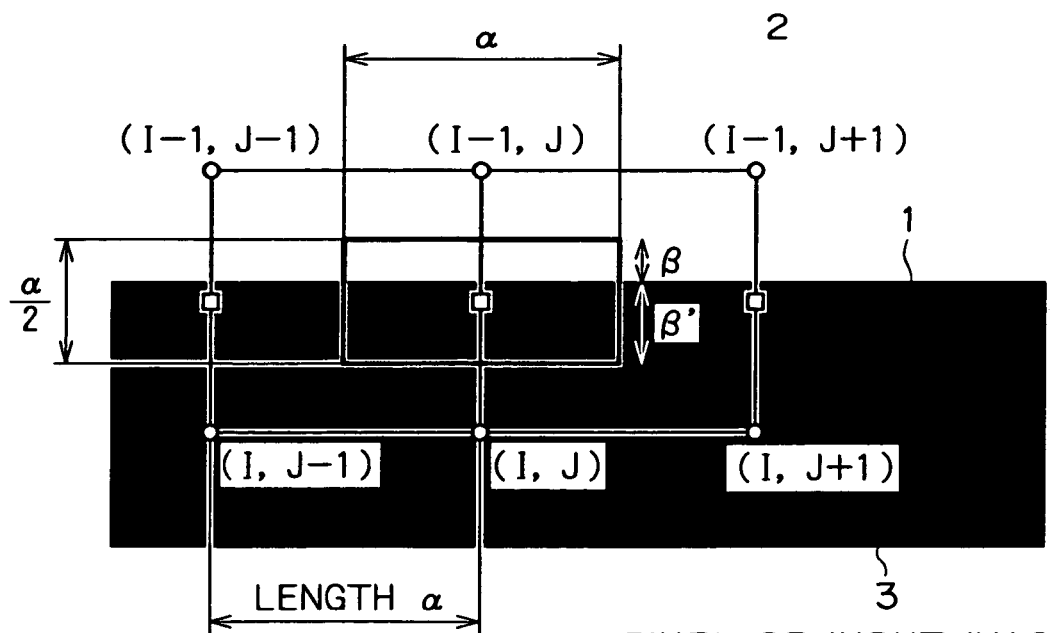

Calculation of a pixel value of a pixel to be produced newly in a case wherein, where the distance between pixels of an input image is represented by α, a boundary line is present within a distance equal to or smaller than α/4 in the vertical direction or within a distance equal to or smaller than α/2 in the horizontal direction, that is, within a range of a rectangle centered at the pixel to be produced newly and having a vertical dimension of α/2 and a horizontal dimension of α is described with reference to FIG. 24B.

For example, where a boundary line extending in a horizontal direction is present in the proximity of a pixel to be produced newly as seen in FIG. 24B, the pixel value of the pixel to be produced newly between (I−1, J) and (I, J) is determined by arithmetic operation by weighting the pixel values of the pixel (I−1, J) just above and the pixel (I, J) just below the pixel value to be produced newly in accordance with the distance between the boundary line 1 and the output pixel. In particular, the pixel value of the pixel to be produced newly between (I−1, J) and (I, J) is calculated by weighting the white pixel and the black pixel at the ratio of β and β' shown in FIG. 24B. This similarly applies also where a boundary line extending in a vertical direction is present in the proximity of a pixel to be produced newly.

Figure 25:
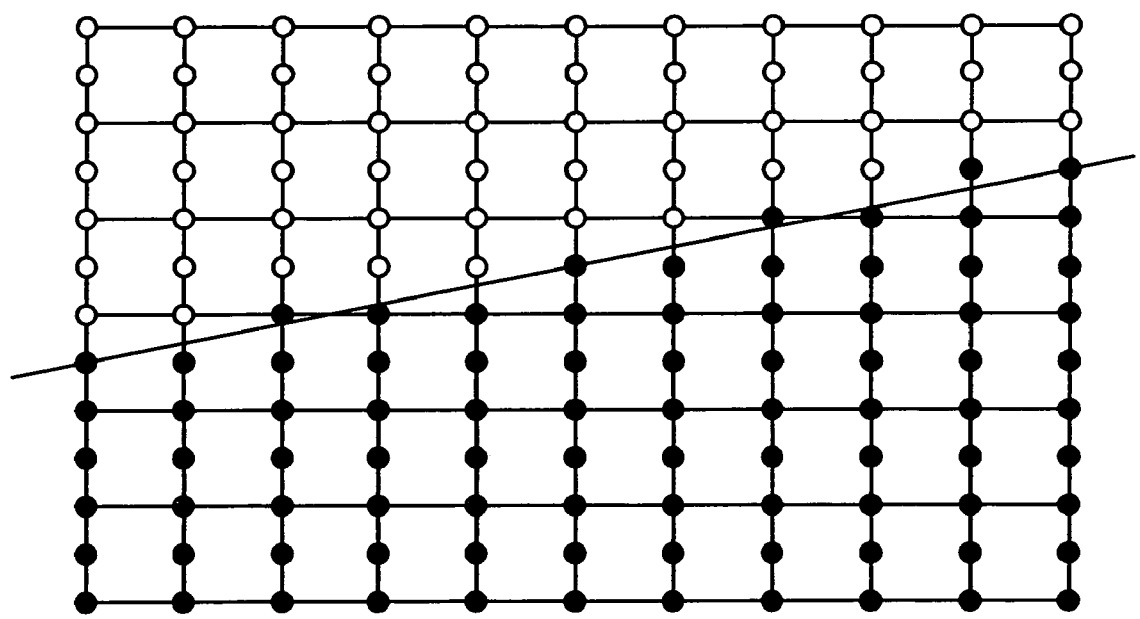

An example of a progressive image determined in this manner is shown in FIG. 25. Pixels in the proximity of the boundary line are outputted as gray pixels each weighted in accordance with the distance between the pixel and the boundary line. Consequently, the jaggy of the progressive image can be removed.

Software for executing the series of processes described hereinabove is installed from a recording medium into a computer wherein a program which forms the software is incorporated in hardware for exclusive use or a personal computer, for example, for universal use which can execute various functions by installing various programs therein.

The recording medium is formed from a package medium which is distributed to provide a program to a user separately from a computer and on which the program is recorded, such as, for example, a magnetic disk 21 (including a floppy disk), an optical disk 22 (including a CD-ROM (Compact Disk-Read Only Memory) and a DVD (Digital Versatile Disk)), a magneto-optical disk 23 (including a MD (Mini-Disk)) or a semiconductor memory 24 as seen in FIG. 6.

Further, in the present specification, steps which describe a program recorded on a recording medium include not only processes which are executed in a time series relationship along a described order thereof but also processes which are not necessarily executed in a time series relationship but are executed parallelly or individually.

While a preferred embodiment of the present invention has been described using specific terms, such description is for illustrative purposes only, and it is to be understood that changes and variations may be made without departing from the spirit or scope of the following claims.

What is claimed is:

1. An image processing apparatus, comprising:
   storage control means for controlling storage of a plurality of pixels inputted thereto;
   detection means for detecting a boundary line between a first pixel of said plurality of pixels and a second pixel of said plurality of pixels by comparing differences between pixel values of said pixels of said first pixel and said second pixel;
   position calculation means for calculating a position of the boundary line with respect to said first pixel;
   weighting means for weighting said first pixel based on the spatial distance between said first pixel and said second pixel and the position of the boundary line calculated by said position calculation means; and
   outputting means for outputting said first pixel, wherein the weighted pixel value is associated with said outputted first pixel.

2. The image processing apparatus of claim 1, wherein the weighting means controls weighting of the pixel value of said first pixel when there is no boundary line between said first pixel and a right-side or left-side adjacent pixel or there is no boundary line between said first pixel and an upper or lower adjacent pixel.

3. An image processing method, comprising:
   controlling storage of a plurality of pixels inputted in a storage device;
   detecting a boundary line between a first pixel of said plurality of pixels and a second pixel of said plurality of pixels by comparing differences between pixel values of said first pixel and said second pixel;
   calculating a position of the boundary line with respect to said first pixel;
   weighting the pixel value associated with said first pixel based on the spatial distance between said first pixel and said second pixel and the position of the boundary line wherein weighting the pixel value includes blending at least two of the pixel values of said plurality of pixels; and
   an outputting step of outputting said first pixel, wherein the weighted pixel value is associated with said outputted first pixel.

4. The image processing method of claim 3, wherein the weighting step controls weighting of the pixel value of said first pixel when there is no boundary line between said first pixel and a right-side or left-side adjacent pixel or there is no boundary line between said first pixel and an upper or lower adjacent pixel.

5. A computer-readable medium on which a computer-readable program is recorded, the computer-readable program comprising:
   a storage control step of controlling storage of a plurality of pixels inputted in a storage device;
   a detection step of detecting a boundary line between a first pixel of said plurality of pixels and a second pixel of said plurality of pixels whose storage has been controlled by the processing of the storage control step by comparing differences between pixel values of said first pixel and said second pixel;
   a position calculation step of calculating a position of the boundary line with respect to said first pixel whose storage has been controlled by the processing of the storage control step;
   a weighting step of weighting the pixel value of said first pixel based on the spatial distance between said first pixel and said second pixel and the position of the boundary line calculated by the position calculation step, wherein said weighting step includes blending at least two of the pixel values associated with said plurality of pixels; and
   an outputting step of outputting said first pixel, wherein the weighted pixel value is associated with said outputted first pixel.

6. The computer-readable medium of claim 5, wherein the weighting step controls weighting of the pixel value of said first pixel when there is no boundary line between said first pixel and a right-side or left-side adjacent pixel or there is no boundary line between said first pixel and an upper or lower adjacent pixel.

* * * * *